Sept. 8, 1959 C. L. DOWNEY ET AL 2,903,675

VISUAL DISPLAY TYPE RADIO SIGNALLING SYSTEM

Filed July 6, 1955 16 Sheets-Sheet 1

INVENTORS
CURTIS L. DOWNEY
FRANCIS H. CHARTREY
HUGO S. FERGUSON

BY [signature]
R. I. Tompkins
ATTORNEYS

Sept. 8, 1959 C. L. DOWNEY ET AL 2,903,675

VISUAL DISPLAY TYPE RADIO SIGNALLING SYSTEM

Filed July 6, 1955

16 Sheets-Sheet 2

INVENTORS
CURTIS L. DOWNEY
FRANCIS H. CHARTREY
HUGO S. FERGUSON

BY

ATTORNEYS

INVENTORS
CURTIS L. DOWNEY
FRANCIS H. CHARTREY
HUGO S. FERGUSON

BY [signature]
R. I. Tompkins
ATTORNEYS

INVENTORS
CURTIS L. DOWNEY
FRANCIS H. CHARTREY
HUGO S. FERGUSON
BY
R. J. Tompkins
ATTORNEYS

VISUAL DISPLAY TYPE RADIO SIGNALLING SYSTEM

Filed July 6, 1955 16 Sheets-Sheet 5

INVENTORS
CURTIS L. DOWNEY
FRANCIS H. CHARTREY
HUGO S. FERGUSON
BY
R. I. Tompkins
ATTORNEYS INVENTORS
CURTIS L. DOWNEY
FRANCIS H. CHARTREY
HUGO S. FERGUSON
BY
R. I. Tompkins
ATTORNEYS Sept. 8, 1959 C. L. DOWNEY ET AL 2,903,675

VISUAL DISPLAY TYPE RADIO SIGNALLING SYSTEM

Filed July 6, 1955 16 Sheets-Sheet 7

INVENTORS
CURTIS L. DOWNEY
FRANCIS H. CHARTREY
HUGO S. FERGUSON

BY [signature] R. I. Tomphins
ATTORNEYS

INVENTORS
CURTIS L. DOWNEY
FRANCIS H. CHARTREY
HUGO S. FERGUSON

BY R. J. Tompkins

ATTORNEYS

Sept. 8, 1959 C. L. DOWNEY ET AL 2,903,675

VISUAL DISPLAY TYPE RADIO SIGNALLING SYSTEM

Filed July 6, 1955 16 Sheets-Sheet 9

INVENTORS
CURTIS L. DOWNEY
FRANCIS H. CHARTREY
HUGO S. FERGUSON

BY [signature]
R. I. Tompkins
ATTORNEYS

INVENTORS
CURTIS L. DOWNEY
FRANCIS H. CHARTREY
HUGO S. FERGUSON
BY R. I. Tompkins
ATTORNEYS INVENTORS
CURTIS L. DOWNEY
FRANCIS H. CHARTREY
HUGO S. FERGUSON
BY
R. I. Tompkins
ATTORNEYS INVENTORS
CURTIS L. DOWNEY
FRANCIS H. CHARTREY
HUGO S. FERGUSON
BY
[signature]
R. I. Tompkins
ATTORNEYS Sept. 8, 1959 C. L. DOWNEY ET AL 2,903,675

VISUAL DISPLAY TYPE RADIO SIGNALLING SYSTEM

Filed July 6, 1955 16 Sheets-Sheet 13

INVENTORS
CURTIS L. DOWNEY
FRANCIS H. CHARTREY
HUGO S. FERGUSON

BY

R. I. Tomphins
ATTORNEYS

INVENTORS
CURTIS L. DOWNEY
FRANCIS H. CHARTREY
HUGO S. FERGUSON
BY
R. J. Tompkins
ATTORNEYS INVENTORS
CURTIS L. DOWNEY
FRANCIS H. CHARTREY
HUGO S. FERGUSON
BY
R. I. Tompkins
ATTORNEYS INVENTORS
CURTIS L. DOWNEY
FRANCIS H. CHARTREY
HUGO S. FERGUSON
BY
R. I. Tompkins
ATTORNEYS United States Patent Office 2,903,675

Patented Sept. 8, 1959

2,903,675

VISUAL DISPLAY TYPE RADIO SIGNALLING SYSTEM

Curtis L. Downey, Traverse City, Mich., Francis H. Chartrey, Cornelius, Oreg., and Hugo S. Ferguson, Fairfax, Vt.

Application July 6, 1955, Serial No. 520,385

24 Claims. (Cl. 340—154)

Figure 1:
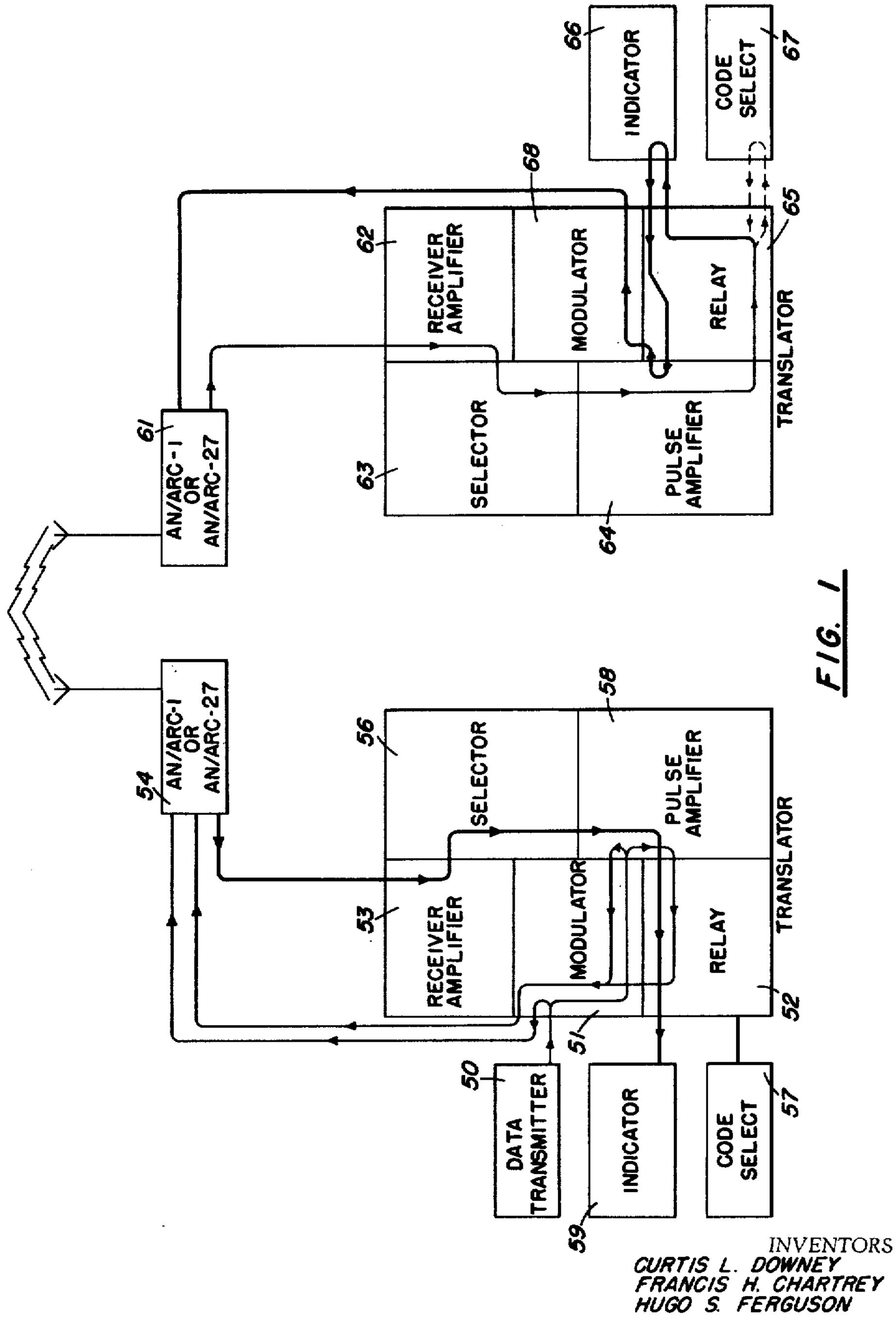

(Granted under Title 35, U.S. Code (1952), sec. 266)

The invention described herein may be manufactured and used by or for the Government of the United States of America for governmental purposes without the payment of any royalties thereon or therefor.

The present invention relates to a visual display type radio sginalling system and more particularly relates to a data transmission-display apparatus designed to transmit, receive and display visually, digital information or data and which is usable with standard radio transmitters and receivers.

This invention presents an extensively modified and improved apparatus of the type found in copending application Serial No. 520,384, filed July 6, 1955, now Patent 2,885,667, May 5, 1959, for Display Type Communications System by Curtis Lynn Downey, Francis Howard Chartrey, Hugo Stanley Ferguson and Clyde Walter Grow.

Accordingly, an object of the invention is to present a new and improved data-transmission display apparatus capable of transmitting, receiving and presenting a display of digital information wherein a master or control station may transmit information such as range, bearing, altitude to one or a plurality of selected stations of a relatively large group of slave stations (99) and wherein indication is visually presented of station selected, messages and execute, the equipment being usable either in a simplex or a duplex communications link and which will be readily adaptable to line-of-sight operation.

Another purpose of the invention is to present an improved design of a visual display radio signalling system suitable for transmitting messages from an airborne CIC (combat information center) to one or more interceptor and/or fighter aircraft.

Another aim of the invention is to present a visual display system to provide means for sending information to a selected recipient rapidly, accurately and with a maximum of security, to provide means of transmitting a general message to many aircraft rapidly; and to provide a communications link capable of being used simultaneously with voice communications, and wherein transmission on very high frequencies having sufficient bandwidth to accommodate supersonic frequency modulation on supersonic frequencies just above the audio spectrum, which is a desirable means to convey the intelligence may be utilized.

Another object of the invention is to provide a visual display radio signalling system capable of utilization of standard radio equipment, and wherein are incorporated features of amplitude modulation of the transmitter, so that simultaneous voice and other communications can be effected, automatic level control for constant output, repeatback of information on secondary frequency, improved repeatback means to check transmission, redesigned improved selector, modulator and relay switching to reduce the number of modulation channels required to transmit intelligence, automatic information reset functions, pulse shaping, circuit isolation, reduction of modulation frequencies required and reduction of size and circuitry.

Another aim of the invention is to provide a visual display radio signalling system wherein are provided means to eliminate spurious keying of adjacent channels, means to eliminate spurious operation of selector relays, means to present constant supersonic voltage output, means to provide simplex operation permitting repeatback with use of only one radio set at each station, and means for insuring operation over ranges extending to the fullest extent of line-of-sight operation at high altitudes.

Another object of the invention is to provide equipment which in conjunction with a prescribed transmitter and receiver or transceiver, presents means of transmitting, receiving, and displaying predetermined types of information, utilizing either simplex or duplex operation of control and receiving stations, wherein information originated at a control station is displayed by a receiving station, retransmitted to the control station and displayed at the control station on a monitor indicator and which will provide for acknowledgement.

Figure 4:
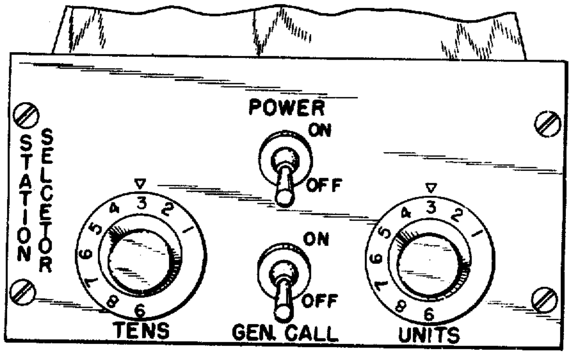
Figure 2:
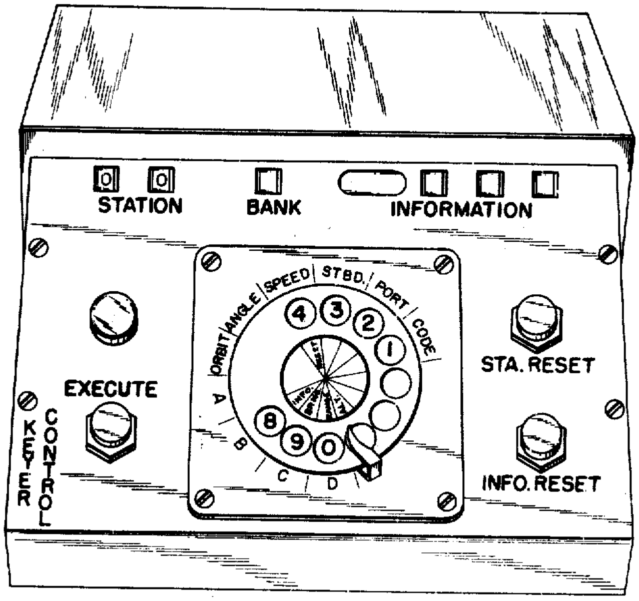
Figure 3:
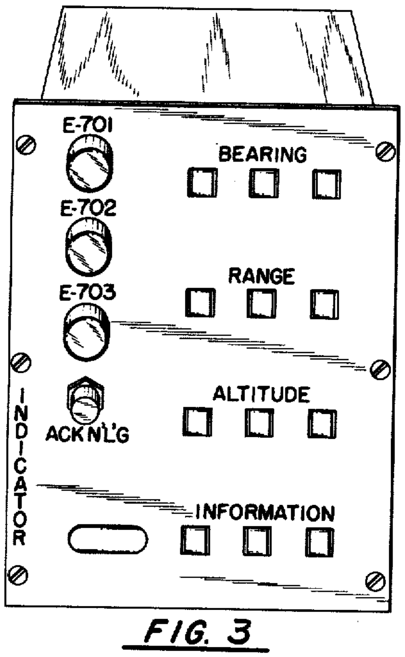
Figure 5:
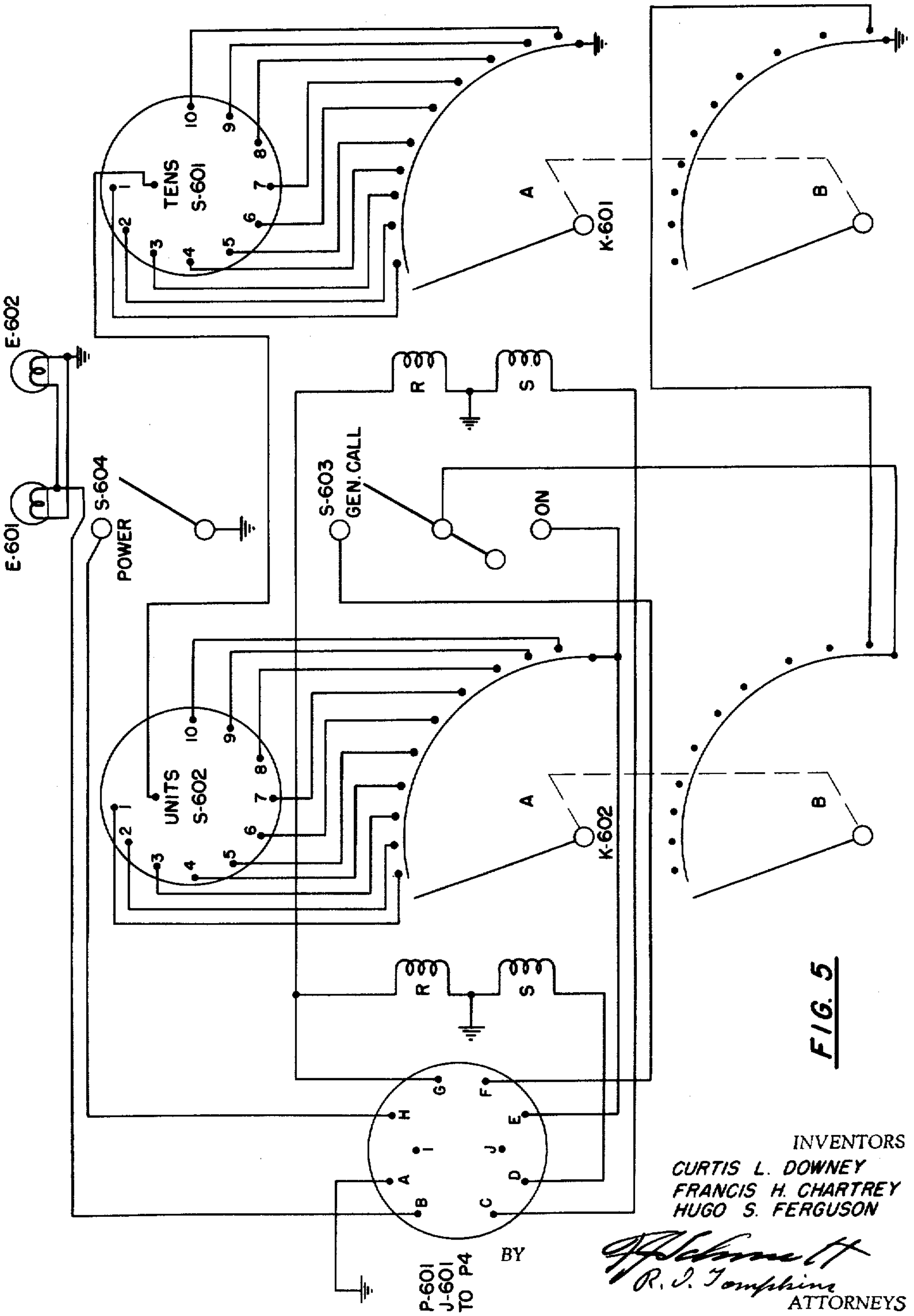
Figure 6:
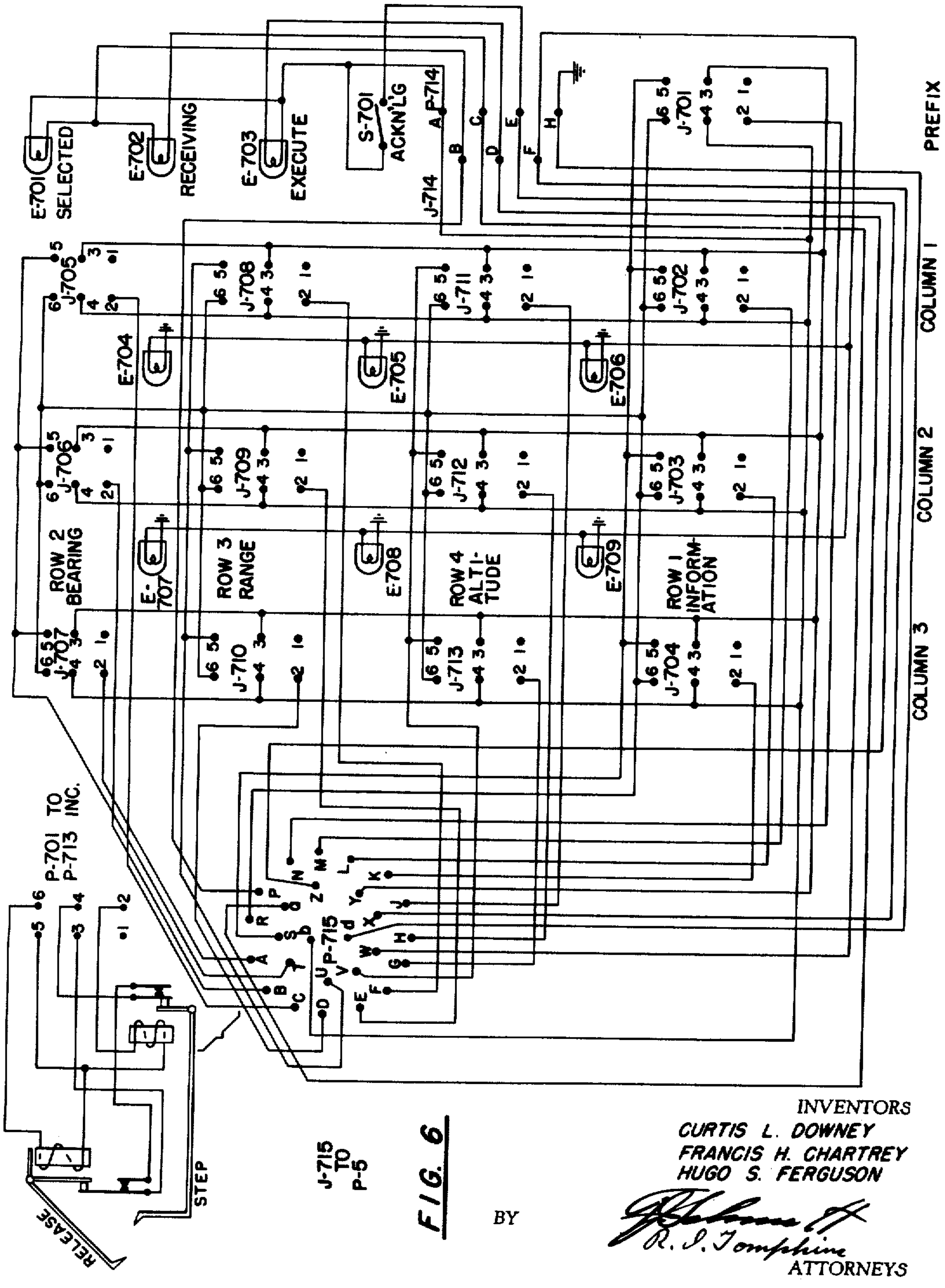
Figure 7A:
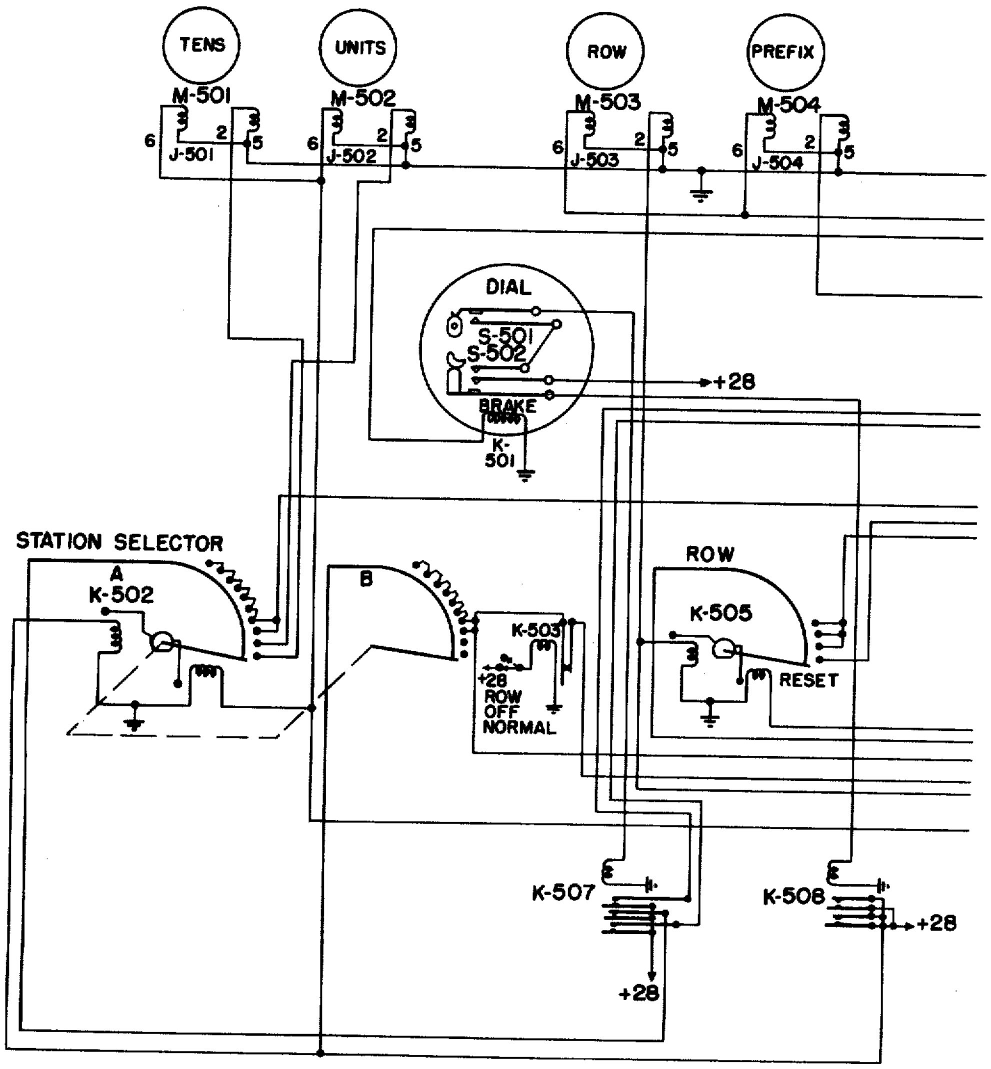
Figure 7B:
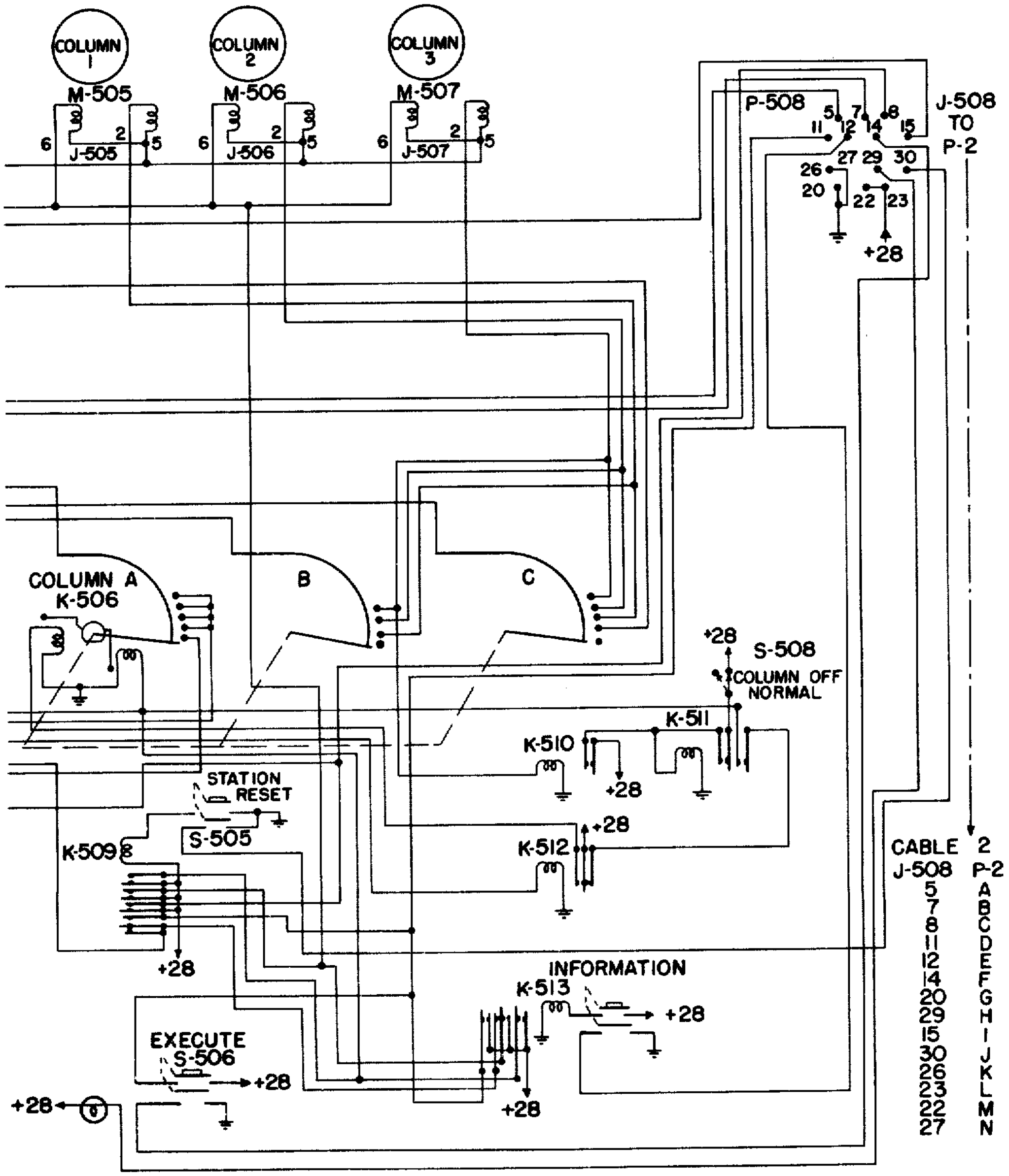
Figure 8:
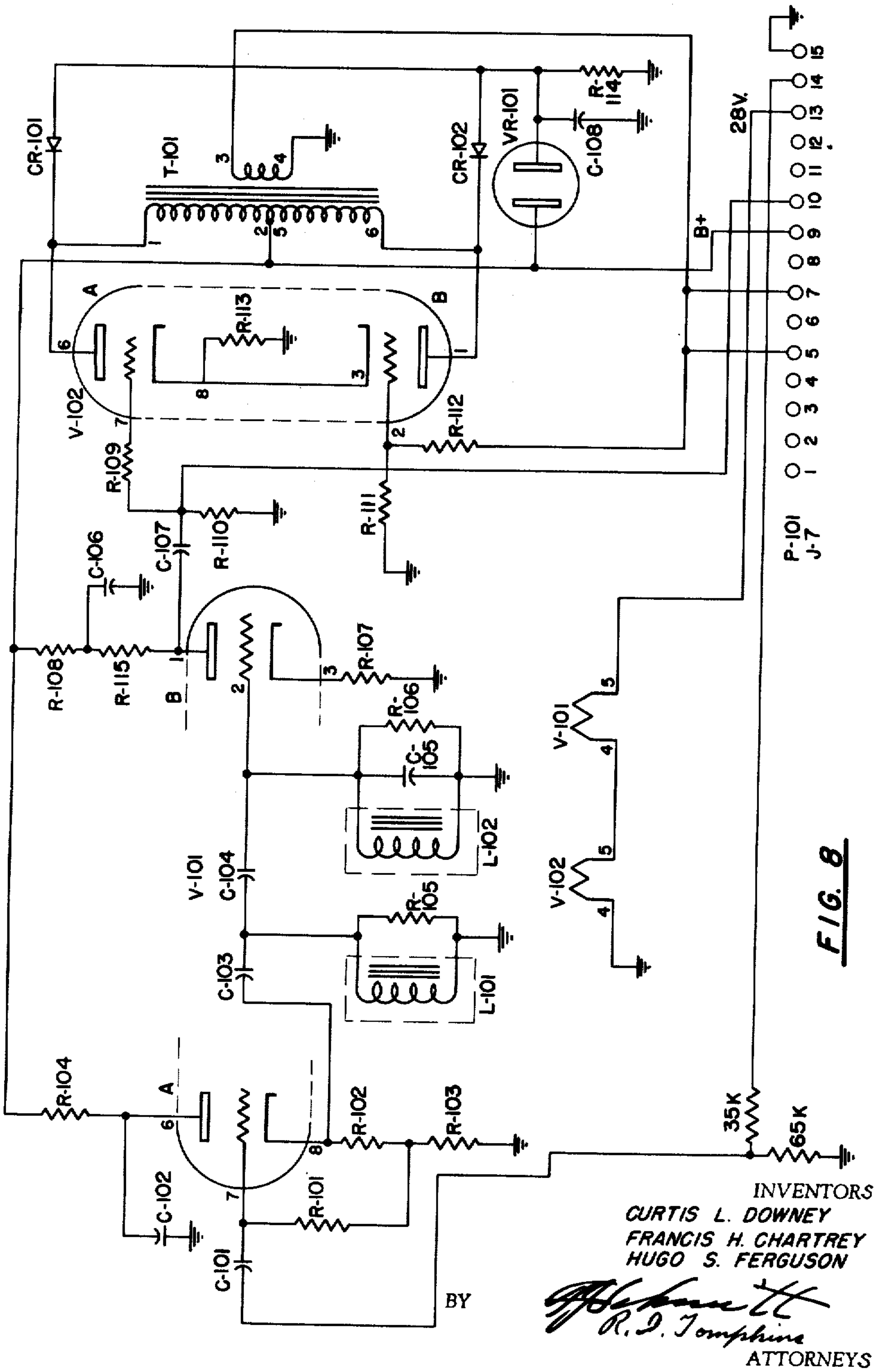

Other objects and many of the attendant advantages of this invention will be readily appreciated as the same becomes better understood by reference to the following detailed description when considered in connection with the accompanying drawings wherein:

Fig. 1 is a block diagram of the control station and selected station apparatus of a preferred embodiment of the present invention, Fig. 2 is an isometric pictorial illustration of the keyer control unit of the preferred embodiment of the present invention, Fig. 3 is an isometric pictorial illustration of the indicator unit of the preferred embodiment of the instant invention, Fig. 4 is an isometric pictorial illustration of the station selector unit of the preferred embodiment of the instant invention, Fig. 5 is a schematic diagram of the station selector unit of Fig. 4, Fig. 6 is a schematic diagram of the indicator panel unit of Fig. 3, Figs. 7*a* and *b* are schematic diagrams of the keyer control unit of Fig. 2, Fig. 8 is a schematic diagram of the receiver-amplifier of the preferred embodiment of the present invention.

Figure 9:
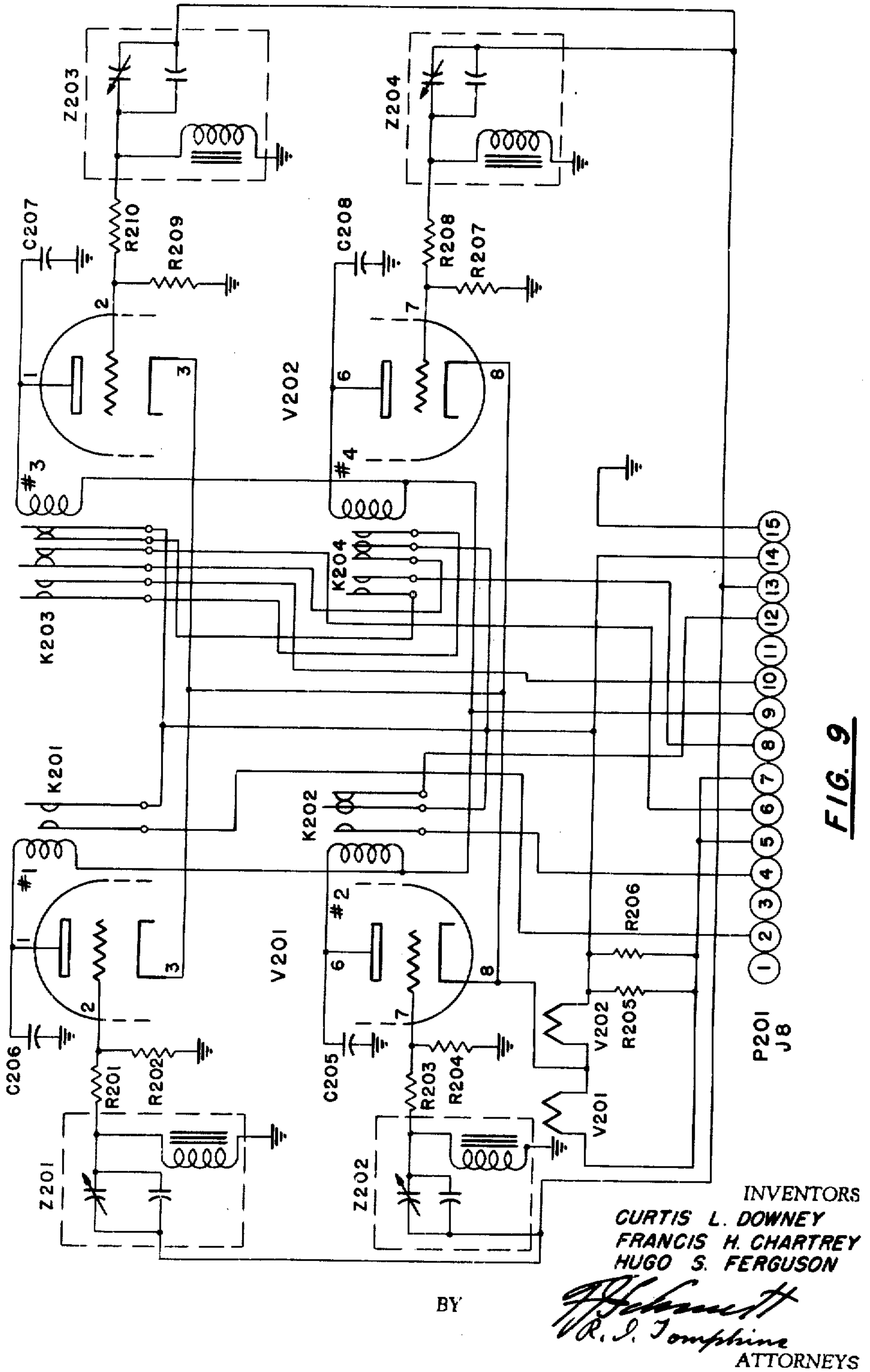
Figure 10A:
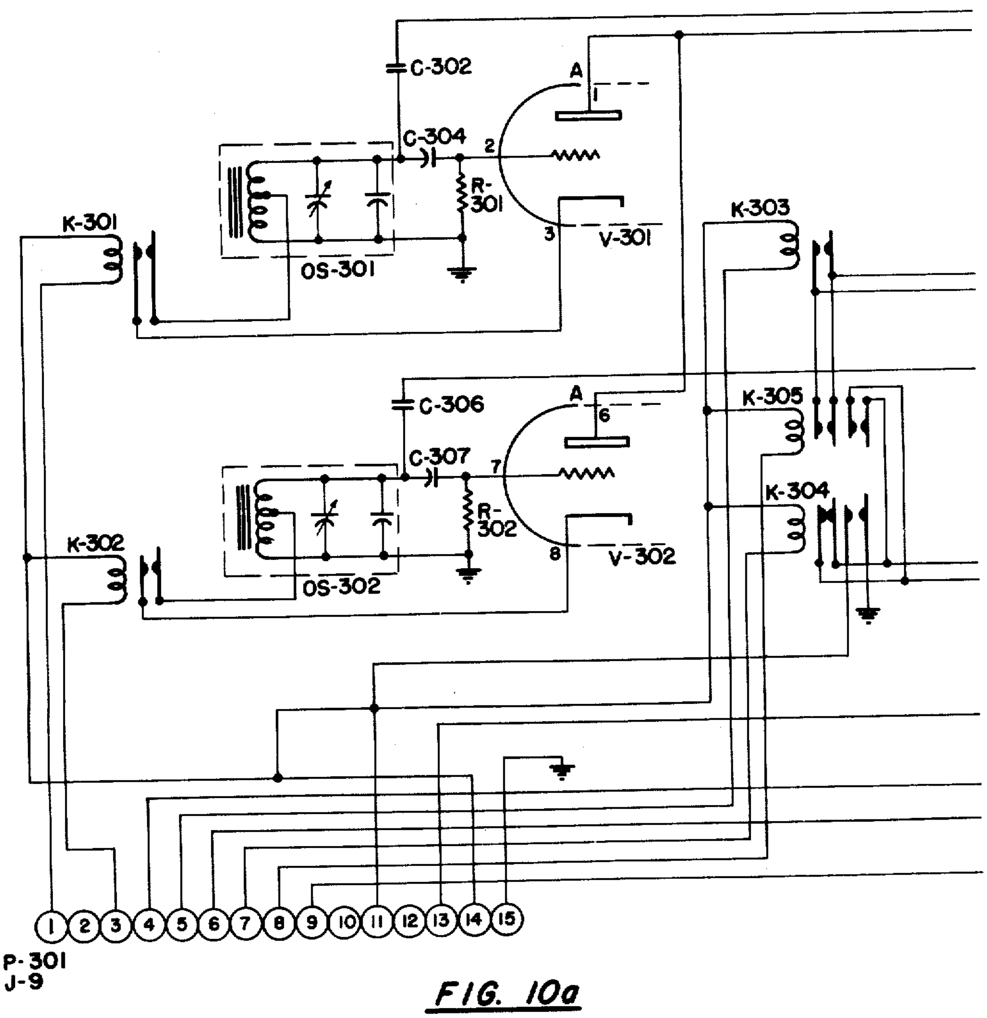
Figure 11:
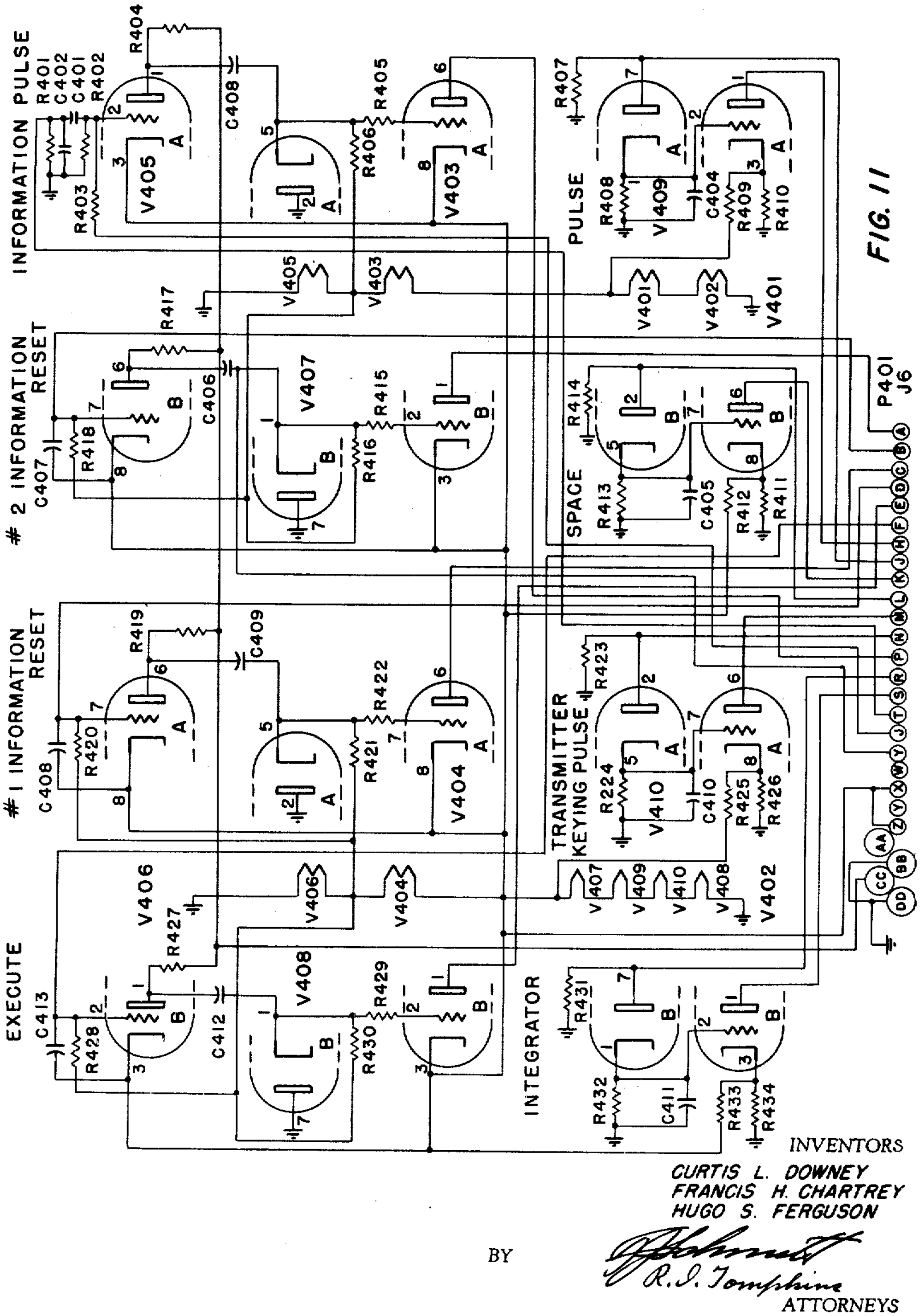

Fig. 9 is a schematic diagram of the selector of the preferred embodiment of the present invention, Figs. 10*a* and *b* are schematic diagrams of the modulator of the preferred embodiment of the present invention, Fig. 11 is a schematic diagram of the pulse amplifier of the preferred embodiment of the present invention.

Figure 15:
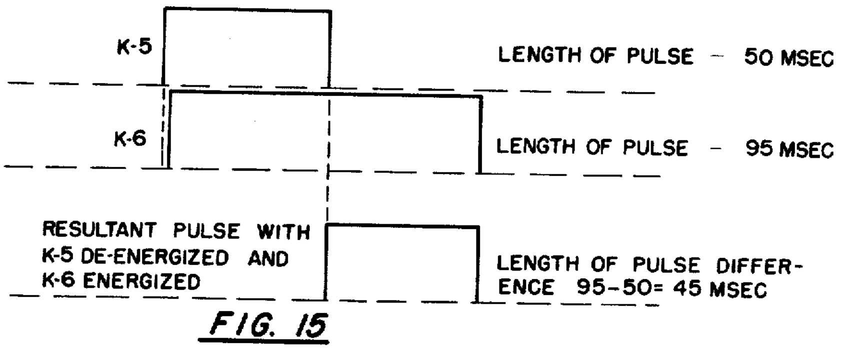
Figure 16:
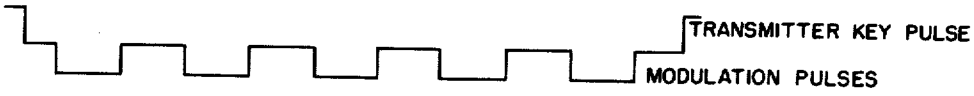
Figure 12A:
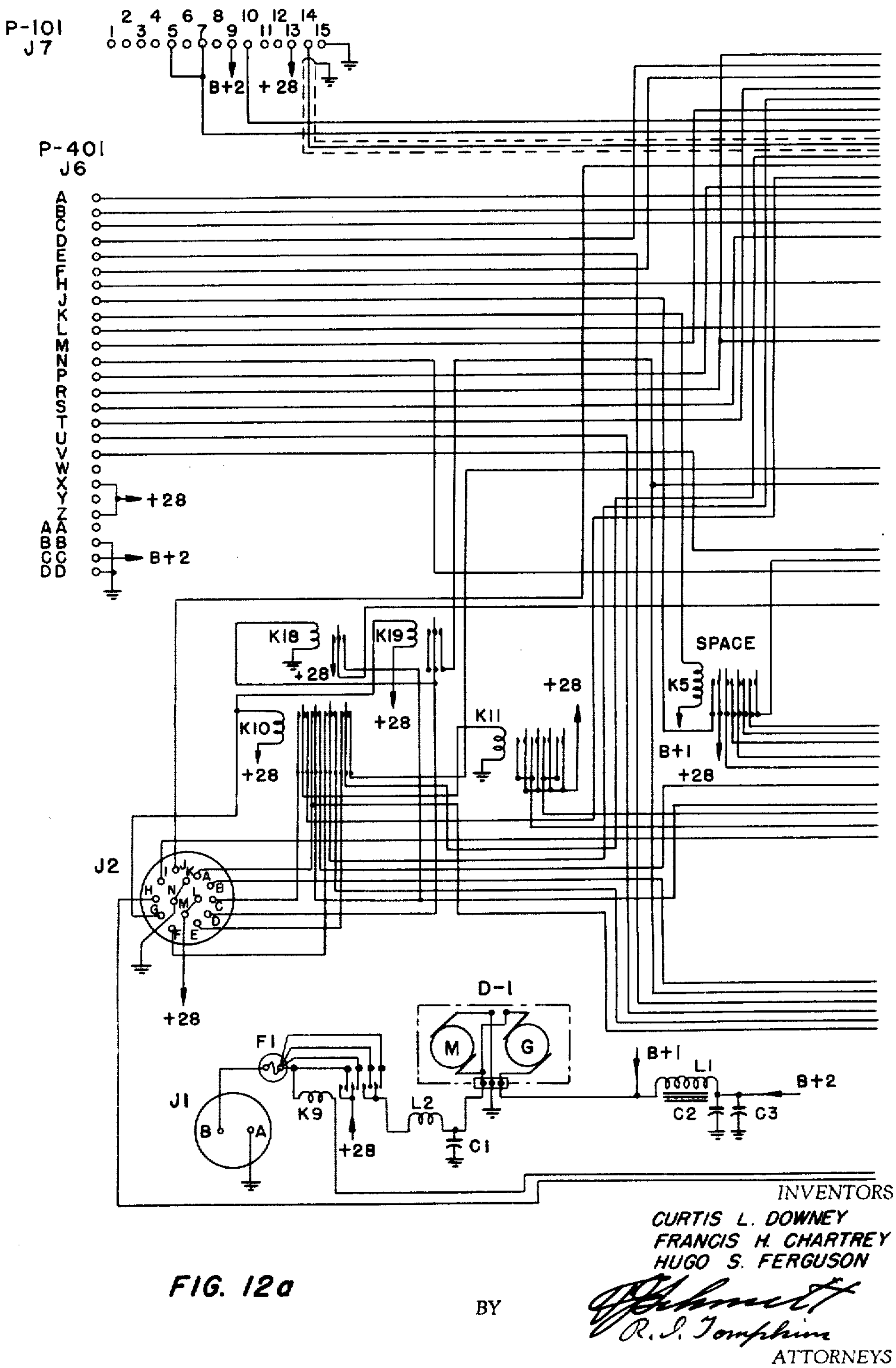
Figure 13:
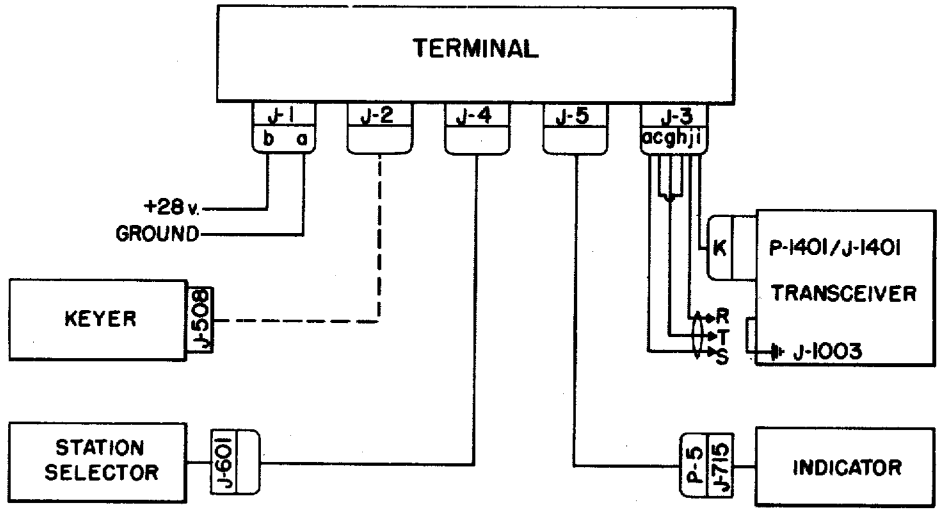
Figure 14:
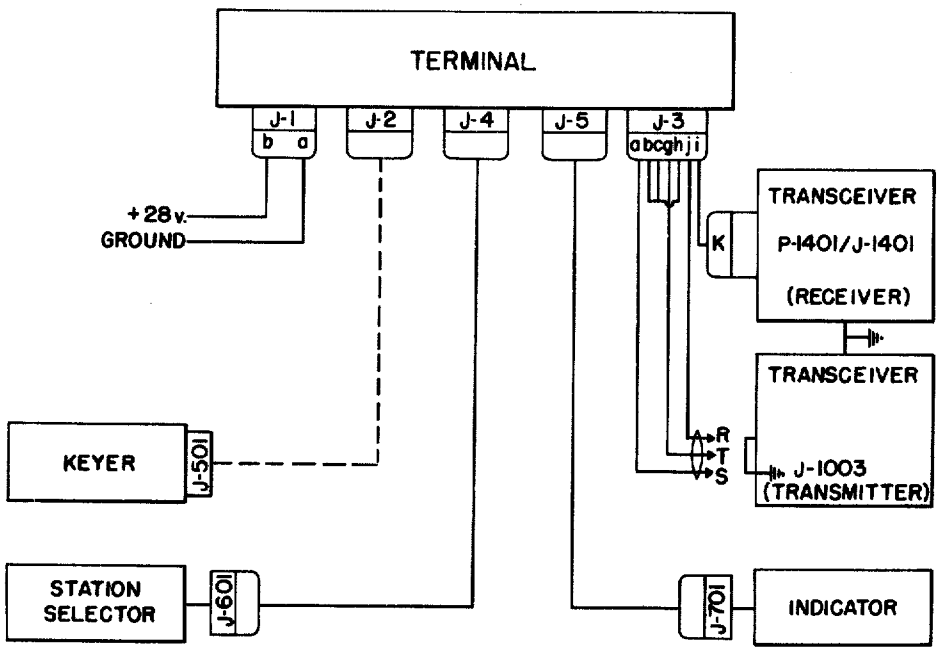

Figs. 12*a*, *b* and *c* present a schematic diagram of the major assembly to coordinate the functions of the plug-in units and the remainder of the data transmission display group of the preferred embodiment of the present invention, Fig. 13 is a cabling diagram of control and receiving stations for simplex operation using AN/ARC-27 receivers, Fig. 14 is a cabling diagram of control and receiving stations for duplex operation using AN/ARC-27 transceivers, Fig. 15 is an operational sequence waveform diagram, and Fig. 16 is a waveform diagram showing keying vs. modulation relationship.

As hereinbefore stated, the present invention presents an improvement of the Display-Type Communications System, Serial No. 520,384, filed July 6, 1955, by Curtis Lynn Downey, Francis Howard Chartrey, Hugo Stanley Ferguson and Clyde Walter Grow, and in particular the present invention comprises an improved, better performing, packaged unit including a packaged data transmission-display group which may in conjunction with standard transmitters and receivers or transceivers (AN/ARC-1 or AN/ARC-27 for example), be used as either a control system or receiving system. Both of the last-named systems may be used on either duplex or simplex operation.

The display system of the invention provides means for sending information to a selected recipient rapidly, accurately, and with high security, permits transmission of a general message to many aircraft rapidly; and provides a communication link capable of being used simultaneously with voice communications. The preferred embodiment utilizes supersonic frequency modulation just above the audio spectrum on very high frequency carrier transmission, thus getting desirable conveyance of intelligence on a wide bandwidth carrier. The inventive apparatus is also capable of frequency-and-amplitude-audio modulation, if simultaneous use with voice communication is not desired. In the preferred embodiment of the invention, units of the above-identified copending application for display type communications system were redesigned, some units were added and some were deleted. A redesigned receiver-modulator-amplifier unit was employed to operate the selector unit and to provide sufficient output from the modulator for 100 percent modulation of the transmitter. The AN/ARW transmitter and receiver were deleted from the present system and the AN/ARC-1 was instituted because of weight and size limitations. Frequency modulation was undesirable because of the many necessary required modifications and because of the greater number of components necessary for proper frequency modulation of the AN/ARC-1 radio set. Accordingly amplitude modulation was accomplished by placing the secondary of the radio signalling system's modulation output transformer in series with the voice modulation output transformer already in the transmitter. Both the receiver-amplifier and the modulation-amplifier have automatic level controls to insure a nearly constant output. Repeatback of the information received by a selected station is accomplished by retransmitting the signal as displayed by the indicator on a second radio frequency to the control station. For this purpose the relay annunciator of application Serial Number 494,585, filed March 15, 1955, now Patent 2,810,521, October 22, 1957, by Francis H. Chartrey was utilized inasmuch as this register or relay annunciator has provisions for initiating repeatback incorporated within it. At the control station, the information is again displayed providing a check on the transmission. Redesign of the relay switching circuits of the hereinbefore mentioned display-type communications system has been effected in the present invention to reduce the number of channels required to transmit the intelligence. By making some of the information-reset functions automatic, adding pulse amplifiers to shape all the pulses, providing isolation between circuits and using some of the pulse amplifiers to replace the functions of several of the controls previously used to originate the information, the inventive system is made to operate satisfactorily on four modulation frequencies as compared with the eight previously used. Improved operation occurs because of this redesign and the fewer operations required in transmitting the information. Further reduction in size and circuitry is made in the modulation amplifier because low level amplitude modulation can be accomplished on both AN/ARC-1 and AN/ARC-27 navy radio sets using frequencies up to 40 kc. Modulation frequencies between 20 and 35 kc. (kilocycles) were chosen in the preferred embodiment although this is nowise to be construed as limiting the invention. The supersonic selector of the invention contains only four (4) selector circuits.

The supersonic amplifier used to amplify the signal obtained from the receiver and to operate the selector unit was previously of the automatic leveling type which needs a variable gain stage to maintain a constant output. An amplifier using this type of D.-C. feed-back control to adjust the gain requires too much time to stabilize the output due to the required filtering of the D.-C. loop. This causes spurious keying of adjacent channels on large signals. With regard to the frequencies of the selector and modulation circuits being changed to conform with the new four-frequency system, more highly selective filters in the selector circuit and nonharmonically related frequencies which were within the 20 to 35 kc. band are used. Previously, the four frequencies covered 20 to 43 kc. Since the selectors were no longer harmonically related, a clipping circuit is used on the output stage of the supersonic amplifier to keep the output voltage constant. The clippers employed are two diodes; consequently, the leveling of the amplifier on large signals is almost instantaneous. This also eliminates attenuation of the output signal below the clipping level.

Another discrepancy in the operation of the first system was the spurious operation of the selector relays. This was due to the high noise level output of the receiver which was amplified by the supersonic amplifier. Measurements indicated that the greatest portion of the noise occurred between 12 and 18 kc. A high-pass filter is incorporated in the supersonic amplifier to limit the frequency response of the amplifier below 20 kc. This filter has more than 16 db of attenuation from 20 to 15 kc. and provides a very desirable decrease in the noise level at the output of the supersonic amplifier.

Two AN/ARC-1 or two AN/ARC-27 radio sets were required at each visual display signalling station to provide a repeat back system because duplex operation was necessary. Since fighter type aircraft carry only one of these radio sets as standard equipment, the system now provides repeatback or check information using only one radio set.

The inventive method of repeat-back of information require the repeat-back of each digit after the receiving station has displayed it. This is accomplished by storing the information at the receiving station on an add-subtract type relay until a sequence of pulses comprised of one digit has been received and then transmitting the stored pulses immediately after receiving the last pulse of the transmission sequence. The add-subtract type relay is controlled during the add operation by the message registers or annunciators which trigger two of the pulse amplifiers, stepping the add relay, and is controlled during the subtract or retransmission operation by a self-mounted contact and two of the pulse-forming amplifiers operating in direct sequence with each other. Thus, the use of the information storing circuit in the receiving systems provides simplex operation and permits repeat-back with the use of only one radio set at each station.

Since signals are being transmitted and received by both the control station and the receiving station on an average of less than every 2 seconds during data-transmission-display with simplex operation, the simultaneous use of voice and data-transmission-display is not permissible because transceiver type radio sets are being used as a means of transmission and reception. However, should voice transmission be used during the transmission of data display information, the voice transmission would take precedence over the data display information. The erratic reception of the repeat-back information would indicate to the operator of the control station that his display transmission loop had been interrupted. The display information must then be retransmitted as soon as the voice transmission is finished. While the deletion of simultaneous operation is a drawback, the actual transmisison time of data display information is very short, being only a maximum of 45 seconds to select a station and send all the information retainable on an indicator at one time.

The original message registers used did not contain a repeat-back pulse generating circuit. They were large, heavy, revised relay-type stepping-switches. A new message register was used the annunciator relay of Francis H. Chartrey heretofore set forth which was both smaller and lighter, containing a positive-type repeat-back pulse generating circuit. The message register now used generates a repeat-back pulse only after the next position is properly displayed on its drum. This register is made of the plug-in type construction to facilitate replacement.

In order to obtain satisfactory operation above a 15 mile range, since beyond this distance, the signal-to-noise ratio from the AN/ARC–27 was reduced to the point where, with the signal being clipped in the amplifier, the noise was of sufficient intensity and of the right frequency to operate the selector circuit relays, or to hold them once energized, a voltage divider was introduced to keep the signal just below the clipping level at minimum R-F levels, and at the same time reduce the radio receiver noise. This provides successful operation to the limits of line-of-sight for altitudes of 5,000 and 10,000 feet.

Thus, the inventive equipment, in conjunction with the prescribed transmitter and receiver, or transceiver, provides a means of transmitting, receiving, and displaying predetermined types of information. Transmission of the information may utilize either simplex or duplex operation. Figures 13 and 14 are cabling diagrams of control and receiving stations set up for simplex and duplex operation, respectively.

Information is originated from a control station and displayed by a receiving station. The information displayed by the receiving station is also retransmitted to the control station where it is displayed on a monitor indicator.

The data transmission-display group may be used as either a control system or receiving system. Both systems may be used on either duplex or simplex operation.

Referring now to the drawings wherein like reference characters designate like or corresponding parts throughout the figures, and with particular reference to Fig. 1, upon initiation of a dialed signal in the data transmitter 50, of the control station, supersonic modulation is generated in modulator 51, which supersonic modulation is imposed on a conventional transmitter (such as the AN/ARC–1 or AN/ARC–27) in a conventional transceiver 54 (or transmitter and receiver). The transmitter of transceiver 54 generates the carrier wave preferably at frequencies in the very high or ultra high frequency range. In relay unit 52 the particular supersonic channel of the modulator 51 to effect corresponding function is determined. The transmitted modulated carrier is received in the receiver section of a conventional transceiver (or transmitter and receiver) 61. The transmitter of transceiver 54 and the receiver of transceiver 61 are both tuned to a primary carrier frequency. The transmitter of transceiver 61 and the receiver of transceiver 54 are both tuned to a secondary frequency. This is done to insure that the message transmitted to the selected station on repeating-back to the control staion will not again be introduced into the receiver of transceiver 61. From the receiver of transceiver 61 the initiated command signal from the control station is amplified in receiver amplifier 62 and passed to the selector 63 where the channel appropriate to the original keyed function is selected. The signal from the selector 63 is shaped and amplified in pulse amplifier 64 and causes the appropriate relay in relay unit 65 to cause display of the desired original keyed in function on indicator 66. Code select units 67 and 57 are included to select the code or number to which a display system will respond and are described in detail hereinafter.

The message register or relay annunciator (see application Serial Number 494,585, filed March 15, 1955, by Francis H. Chartrey) on giving desired display, simultaneously initiates a repeat-back signal which is sent through modulator 68 where supersonic modulation in accordance with the information to be repeated-back is generated and impressed on the carrier from the transmitter of transceiver 61 and the modulated carrier transmits the information to the control station. The repeat-back signals are received in the receiver of transceiver 54, amplified in receiver amplifier 53, sent through the appropriate channel in selector 56, amplified in pulse amplifier 58 and sent through relay unit 52 to the indicator 59. The code selectors 57 and 67 generally select the code or number to which a display system will respond.

In the following sections of this application structural features of the receiving station, the control station and each of the comprising units are described, following which a description of simplex and of duplex operation as best shown in Figs. 13 and 14 is given, and then a detailed description of operation of the apparatus and behavior of the components thereto is made.

RECEIVING STATION

A receiving station may be either an airborne, ship, or ground installation. A receiving station consists of a data transmission-display group with the addition of a transmitter and receiver of a transceiver. The receiving station is a slave to a control station operating on the same radio frequency.

One of the functions of the receiving station is to receive and decode all station selection information. When selected, the receiving station will receive and decode all information and retransmit the data displayed. Also, when selected, the party monitoring the receiving station may send an acknowledgement signal to the control station.

Each receiving group consists of three units: the station selector panel, the indicator panel, and the terminal.

The station selector panel contains four controls used in operating a receiving system. A power "On-Off" switch S–604 is provided for turning the receiving system on and off. A "General Call" switch S–603 provides retransmission during a general call. Only the station with the "General Call" switch in the "On" position will repeat back information to the control station. Two ten-position rotary switches S–601 and S–602 are provided to select the numeral code of the station which will display information and send back checking information. Within the unit are two stepping relays K–601, K–602 which, in conjunction with the two rotary switches, constitute the station code selection circuits. The unit may be console mounted.

The terminal (see Figs. 12*a*, *b* and *c*) interconnects all units of the receiving station. Mounted externally is a dynamotor which supplies the high voltage necessary for the receiving system. Four plug-in type chassis may be provided to mount the circuits in the most accessible manner. The four chassis are designated as follows: the receiver amplifier, the supersonic selector, the modulator and modulation amplifier, and the pulse amplifier unit.

The receiver amplifier (Fig. 8) increases the high fidelity cathode follower output of the radio receiver to a power level sufficient to operate the selector circuits (Fig. 5). The frequency response of the amplifier is ±2 db from 20 to 35 kc. A high-pass filter is used in the amplifier to provide attenuation below 20 kc. The amplifier has a low impedance output unbalanced to ground, which matches the push-pull output stage to the input of the supersonic selector unit.

The supersonic selector unit (Fig. 9) contains four frequency selector circuits. Each frequency selector circuit consists of a series resonant circuit Z–201, Z–202, Z–203, Z–204 in the grid circuit of a vacuum tube and a high resistance relay K–201, K–202, K–203, K–204 in the plate circuit. All center frequencies are between 20 and 35 kc., but adequately separated to provide the necessary selectivity. None of the center frequencies are closely related harmonically. The relay in the plate circuit of the selector operates when the signal from the receiver amplifier contains sufficient power output at the resonant frequency of the channel.

The modulator and modulation amplifier Figs. 10*a* and *b* supplies four supersonic frequencies through a common amplifier of sufficient power to modulate the transmitter 95 percent. Each of the frequency generators of the modulator is keyed by a relay.

The pulse amplifier unit Fig. 11 contains eight pulse amplifiers, four of which are pulse delay amplifiers and the remaining four pulse lengthening amplifiers. The pulse amplifiers control all the operational sequences and speed of the visual display system.

The Indicator Panel (see Figs. 3 and 6) holds thirteen plug-in type message registers, or annunciators. These registers may be electro-mechanical indicators which display information. They contain contacts for originating the repeat-back of information which is returned to the control station. Also used for checking the operation of the system are two lights, one light E701 indicates when the station is selected, and the other light E702 indicates when information is being received. A third light E703 is used to display execute information. An acknowledge control S701 is accessible on the indicator panel and is used to originate an acknowledge signal. The unit may be console mounted.

CONTROL STATION

A control station may be either an airborne, ship, or ground installation. A control station is a data transmission-display group with the addition of a transmitter and a receiver or a transceiver.

The function of the control station is to transmit station selection and display-type information to the receiving stations. It also receives and displays monitor or repeat-back information from the selected receiving station. The control station on its own radio frequency maintains complete control of all receiving stations.

Each control group utilizes the same type of units as the receiving group plus a Keyer Control.

The station selector panel, indicator panel, and visual display terminal are briefly described in the receiver system theory section.

Connecting the Keyer Control, Figs. 7*a* and *b*, to the visual display terminal changes the equipment from a transpondor to a transmitter-receiver. The Keyer Control is used to originate all information transmitted from the control station. In addition to controlling all information being sent out from a control station, the Keyer Control displays locally all transmitted information.

TERMINAL UNIT

As controlled by the Keyer Control, the Terminal Unit (see Figs. 13 and 14) turns the R-F carrier "on and off" and selects and codes the subcarrier frequencies. It also decodes received subcarrier information. It routes all information and supplies power for all units of the data transmission display group.

The terminal unit contains two two-position switches which control the unit as follows: simplex-duplex switch for changing from simplex to duplex operation and the blanking switch used to either provide or delete blanking of the receiver amplifier.

Figure 10B:
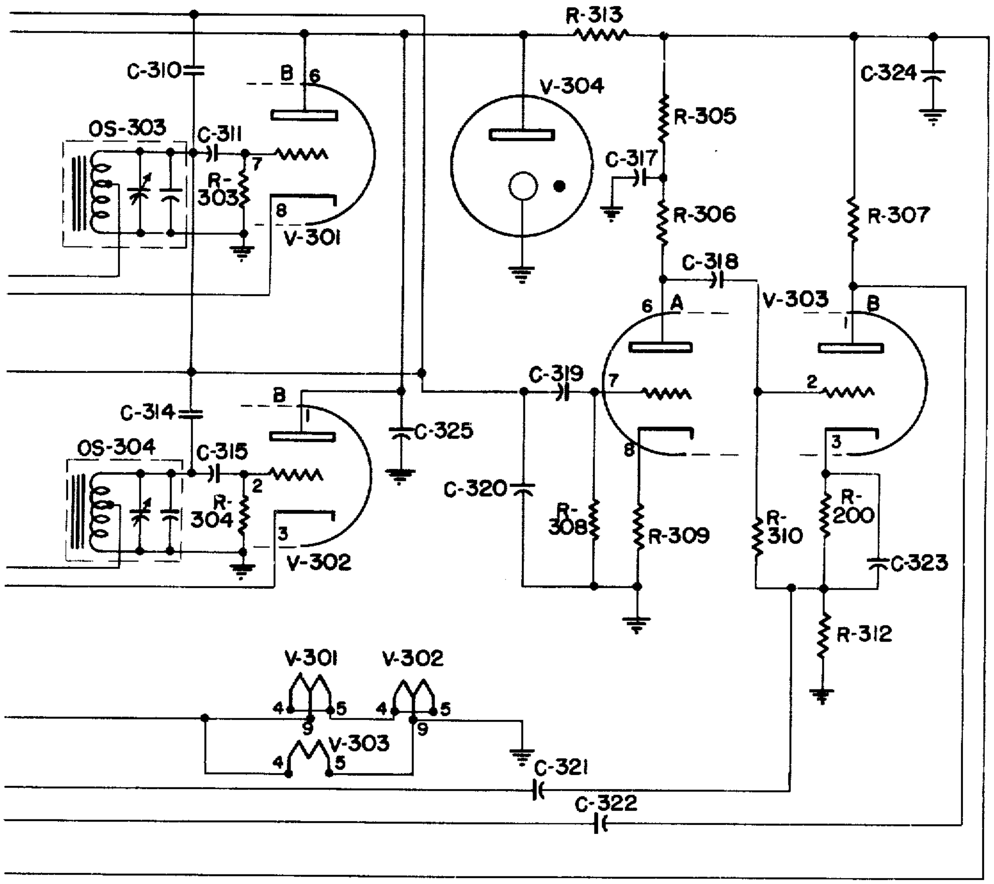
Figure 12B:
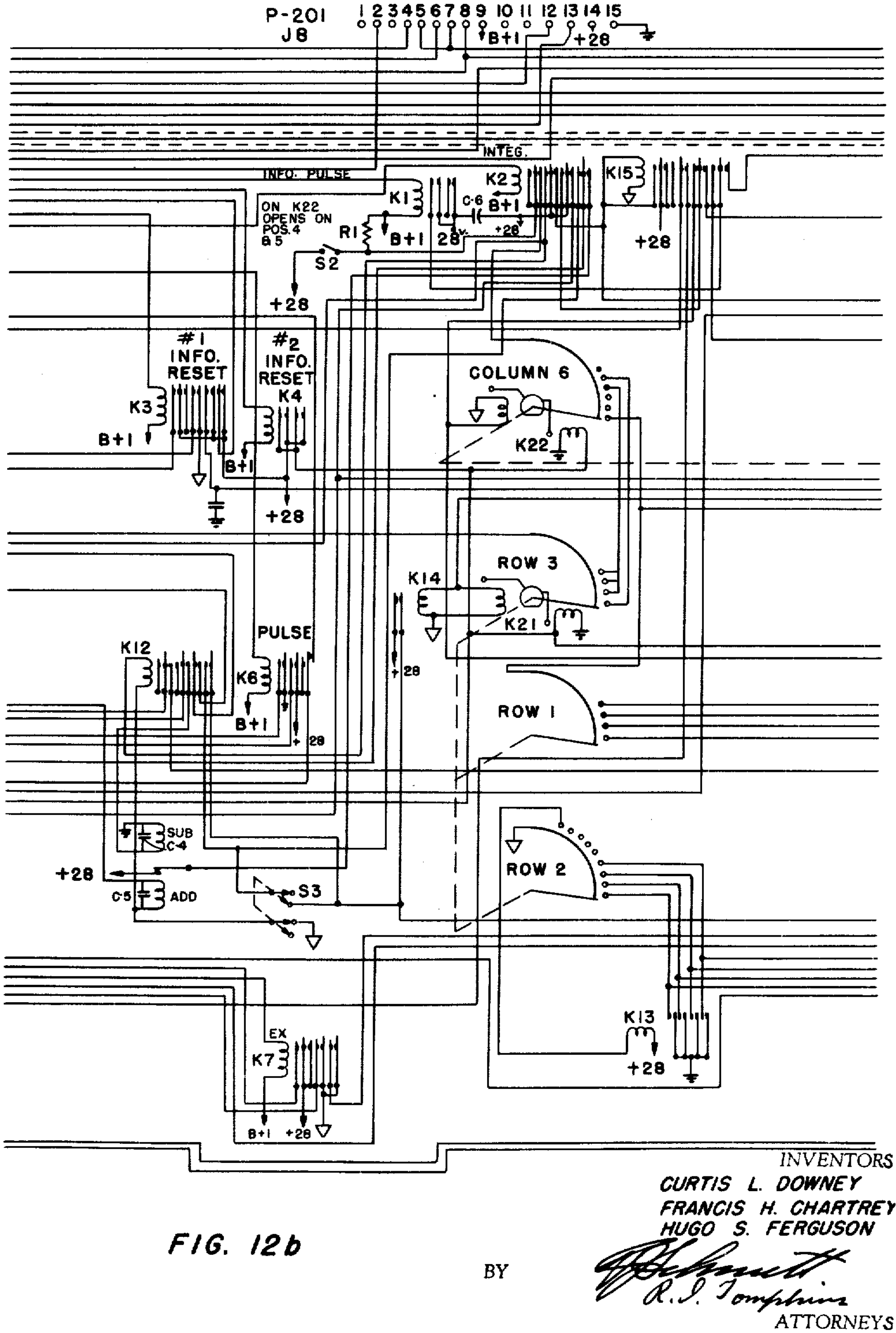
Figure 12C:
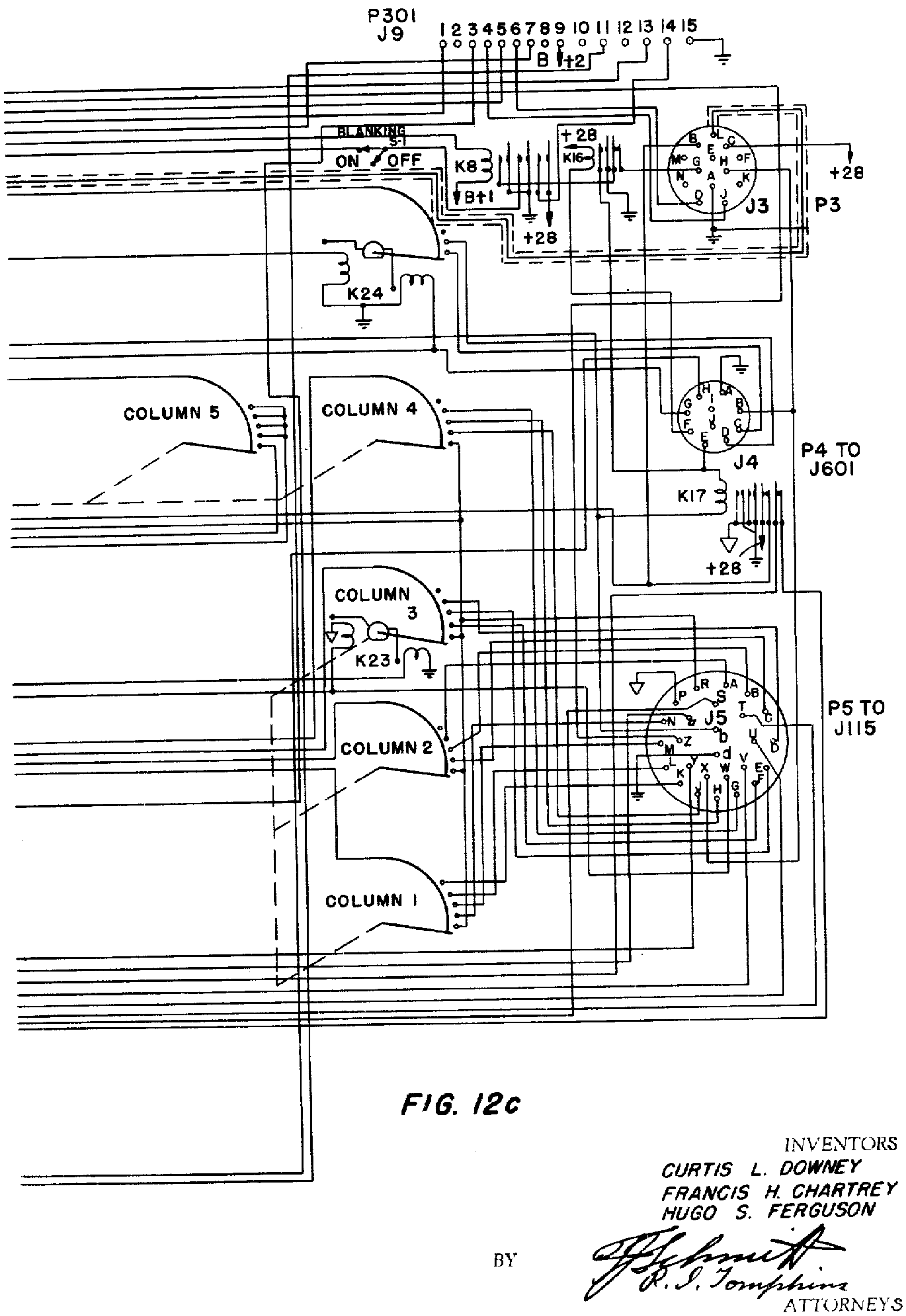

The terminal may consist of a major assembly Figs. 12*a*, *b* and *c* and five plug-in units:

| | |
|---|---|
| Receiver amplifier | Fig. 8 |
| Selector | Fig. 9 |
| Modulator | Figs. 10*a* and *b* |
| Pulse amplifiers | Fig. 11 |
| Dynamotor | Fig. 12*a* |

The major assembly contains relays and the necessary cabling to coordinate the functions of the plug-in units and the remainder of the data transmission-display group.

RECEIVER AMPLIFIER (*a.1*) The receiver amplifier, Fig. 8, is used to amplify the signal output of the communications receiver to a lever useable for operating the selector unit. The output of the receiver amplifier is unbalanced to ground and ranges from 1.5 to 3 v.

(*a.2*) The output of the communications receiver is coupled to the receiver amplifier through pin L of J–3, through pin 14 of J–7 and P101 to pin 7 of V101 through a voltage divider network and a 250-$\mu\mu$f. condenser C101. V101–A is a cathode follower feeding into a high-pass filter. The signal is coupled from the plate of this voltage amplifier through a 510-$\mu\mu$f. condenser C107 and a 10,000-ohm grid limiting resistor R109 to pin 7 of V102. V102 is a push-pull transformer-coupled output stage. The signal which is applied to pin 2 of V102 is 180 degrees out of phase with the signal applied to pin 7 of V102. This signal is obtained from a voltage divider R111 and R112 across the secondary of the output transformer T101.

(*a.3*) To maintain a constant output voltage from the output stage, a clipping circuit is used. The clipping circuit uses two 1N39 crystals, CR101 and CR102, and one NE–32 bulb, VR101. The anodes of the crystals are connected to the junction of R114 and VR101. The cathode of CR101 is connected to the plate, pin 6, of V102 and the cathode of CR102 is connected to the plate, pin 1, of V102. VR101 maintains a constant voltage with reference to the voltage applied to the center tap of the output transformer or the voltage supply for the output stage. With the crystals connected to this reference voltage point, any signals present on the plates of the output tube which are larger in magnitude than twice the reference voltage will cause the crystals to conduct during the negative part of the signal, and thus limit the plate swing in the negative direction to this predetermined voltage level. Since the output stage is push-pull, the effect of having two similarly clipped signals on the plates of the output stage will produce a symmetrically clipped signal output on the secondary of transformer T101. The output transformer T101 is a step-down transformer which provides a low impedance output. The output of the receiver amplifier is coupled through pins 5 and 7 of P101 and through J–7 to the selector.

(*a.4*) A lead used for blanking out the receiver-amplifier during certain types of operation of the equipment is connected from pin 10 of J–7 and P101 to the junction of R109, R110, and C107.

SELECTOR (*b.1*) The function of the selector, Fig. 9, is to change four preselected supersonic frequencies to 28-v. control pulses. The four supersonic frequencies are 21, 25, 29, and 33 kc.

(*b.2*) The signals, as received from the receiver amplifier through pin 13 of J–8 and P201, are applied to the four series-resonant circuits connected in parallel. The high impedance point of each of the series resonant circuits is coupled to the grid of a vacuum tube by a decoupling resistor R201, R202, R208, R210. Each of the four vacuum tubes has in its plate circuit a plate-current type relay K201, K202, K203, K204. When the signal applied to pin 13 of P201 is of any of the preselected frequencies and large enough in amplitude, the series resonant circuit which is tuned to the applied frequency will develop a voltage at the grid of its associated vacuum tube causing the tube to conduct and close the relay. Each plate-current type relay is by-passed with a 0.01 $\mu$f. condenser C206, C205, C207, C208 to partly filter the A.-C. signal which is impressed across the relay coil. Since none of the other three resonant circuits are tuned to that frequency, very little voltage will appear across their respective resonant circuit to be coupled to the grids of the vacuum tubes.

(b.3) A 21-kc. signal will energize K201 applying 28 v. to pin 2 of P201. A 25-kc. signal will energize K202 applying 28 v. to pin 4 and removing 28 v. from pin 12 of P201. A 29-kc. signal will energize K203 applying 28 v. to pin 6 of P201. A 33-kc. signal will energize K204 applying 28 v. to pin 8 of P201. A combination of 29- and 33-kc. signals will energize K203 and K204 applying 28 v. to pin 10 of P201.

MODULATOR (c.1) The modulator, Figs. 10a and b, supplies four supersonic frequencies of sufficient amplitude to modulate the transmitter. The supersonic signals are applied to the microphone input of the transmitter.

(c.2) The supersonic signals are originated by four frequency generators. The frequency generators are L–C type oscillators and are normally in a cut-off state. Completing the cathode circuit of a frequency generator allows it to operate at its preselected frequency. The cathode circuits are completed by four relays: K301, K302, K303, and K304. Grounding pin 1 of P301 energizes relay K301 generating 21 kc. Grounding pin 3 of P301 energizes K302 generating 25 kc. Grounding pin 7 of P301 energizes K304 generating 33 kc. Grounding pin 8 of P301 energizes K305 generating 29 and 33 kc. Grounding pin 5 of P301 energizes K303 generating 29 kc.

(c.3) The outputs of the frequency generators are capacitively coupled to the grid, pin 7, of V303. The 82-μμf. condensers C302, C306, C310, and C314 in conjunction with 5100-μμf. condenser C320 make up a capacitive voltage divider to decouple the frequency generators and provide an equal output from each frequency generator. The signal is amplified through tube V303–A and coupled from the plate, pin 6, to the grid, pin 2, of V303–B through 500-μμf. condenser C318. V303–B is used as a phase-splitter to provide a signal balanced to ground. This output is coupled through pins 4 and 6 of P301 and J–9.

(c.4) A voltage-regulating tube, V304, is provided to insure stable operation of the frequency generators. The voltage is regulated at 107 v. to supply the frequency generators.

PULSE AMPLIFIERS (d.1) The pulse amplifier unit, Fig. 11, forms all control pulses used throughout the data transmission display group.

(d.2) There are eight pulse amplifiers in the pulse amplifier unit. They are described as follows: the information pulse amplifier, first information-reset amplifier, second information-reset amplifier, execute amplifier, pulse amplifier, space amplifier, transmitter keying amplifier, and integrating amplifier.

(d.3). The information pulse amplifier consists of V405–A, V407–A and V403–A. During normal operation, pin T of P401 and J–6 has 28 v. with respect to ground applied to it. Pin 16 is connected to the input grid or pin 2 of V405–A by 5100-μμf. condenser C401. A differentiator circuit consisting of C401 and R402 is used to differentiate the signal which is applied through pin T of P401 to the grid, pin 2, of V407–A. When the +28 v. is removed from pin T of P401, a short negative pulse will appear at the grid V405–A. Being negative, this pulse will not operate the tube, because the cathode, pin 3, has +28 v. bias applied to it, and the tube is therefore in a cut-off condition. Applying +28 v. to pin T of P401 will now apply, by means of the differentiator circuit, a short positive pulse to the grid of V405–A making the tube conduct heavily. This provides a sharp negative signal on the plate, pin 1, of V405–A. This signal is coupled to the grid, pin 7, of V403–A through 0.1 μf. condenser C403 and grid limiting resistor R405. The discharge resistor for condenser C403 is R406 which is paralleled by diode V407–A. Since the cathode of the diode is connected directly to C403, the negative signal makes the diode conduct heavily and discharge C403 very rapidly. The purpose for discharging the condenser rapidly is to prevent any negative pulses from blocking the grid of V403–A. Since the positive pulse applied to the grid of V405–A was very short, the plate of V405–A will remain at low potential for a very short time and then return to its normal state, which is approximately equal to the source voltage because the tube is nearly cut-off. When the plate returns from a low value to a high voltage level, the positive signal, which is coupled through C403, is applied to the grid of V403–A through grid limiting resistor R405. Since the cathode of V403–A is connected directly to +28 v. and the grid return R406 is connected to +14 v. the tube has 14 v. negative bias at all times in a static state. The positive pulse applied to the grid of V403–A allows the tube to conduct and make current flow through its plate load K–1, a 20,000-ohm plate current type relay, which energizes the relay. The length of time the relay remains closed is dependent on the R–C time constant of C403 and R406 in the grid circuit of V403–A. A positive pulse may also be applied to the information pulse amplifier through pin 19 of P401. In this case the plate relay K–1 will not operate until the positive voltage is removed allowing the plate of V405–A to return to static condition again. These positive pulses will appear on pin U of P401 only when a Keyer Control is used with the system.

(d.4) The first information reset amplifier consists of V406–A, V408–A, and V404–A. When +28 v. is applied to pin D of P401, the voltage is coupled directly to pin 7 of V406–A. Since the cathode, pin 8, of V406–A is connected to 28 v. positive, and the applied grid return R420 is connected to 14 v. positive, the signal on the grid allows the tube to conduct heavily, producing a large negative signal on the plate of V406–A which is coupled to V404–A through C409 and grid limiting resistor R422. Resistor R421 is paralleled by diode V408–A. All negative signals coupled to the grid will be rapidly discharged by the diode to prevent grid blocking of V404–A. When the positive voltage is removed from pin D of P401, V406–A will again return to a nearly cut-off condition and a large positive signal will be coupled to the grid of V404–A. Since V404–A is normally cut-off by 14 v. negative bias, the positive signal allows V404–A to conduct and make plate current flow through the plate load K–3, a 20,000-ohm plate current type relay, energizing the relay. The length of time the relay will remain energized depends on the R–C time constant of C409 and R421 in the grid circuit of V404–A.

(d.5) The second information reset amplifier consists of V405–B, V407–B, and V403–B. The second information reset amplifier will respond to signals on pin B of P401 and will operate relay K–4 of the terminal. A lead is connected directly from pin V of P401 to the junction of C406, R415, and R416. When a +28 v. signal is applied to pin V of P401, V403–B will conduct, energizing K–4.

(d.6) The execute amplifier consists of V406–B, V408–B and V404–B. The execute amplifier will respond to signals on pin F of P401 and will operate relay K–7 of the terminal.

(d.7) The pulse amplifier consists of V409–A and V401–A. Applying positive 28 v. to pin J of P401 causes V409–A to conduct, placing a positive signal on the grid, pin 2 of V401–A. Since V401–A has a combination of fixed and self bias of about 19 v., the positive voltage on the grid of V401–A causes this tube to conduct heavily, operating relay K–6. The length of time relay K–6 will remain energized depends on the length of pulse applied (positive) to pin J of P401 and the R-C time constant of C404 and R408 in the grid circuit of V401–A. After the positive pulse has been removed from pin J, the relay K–6 will remain energized until the condenser C404 in the grid circuit of V401–A has discharged sufficiently to allow the plate current to drop below the amount required to retain the plate relay in an energized state.

(d.8) The space amplifier consists of V409–B and V401–B. The space amplifier will respond to positive pulses applied to pin L of P401 and will operate relay K–5 of the terminal.

(d.9) The transmitter keying amplifier consists of V410–A and V402–A. The transmitter keying amplifier will respond to positive pulses applied to pin N of P401 and will energize relay K–8 of the terminal.

(d.10) The integrating amplifier consists of V410–B and V402–B. The integrating amplifier will respond to positive pulses applied to pin R of P401 and will energize relay K–2 of the terminal. In the operation of the integrating amplifier, a train of pulses applied to pin R of P401 will retain the plate relay, K–2, in an energized condition as long as the train of pulses keeps the signal on the grid positive enough to allow conduction through V402–B and relay K–2 above the de-energizing point of relay K–2.

DYNAMOTOR

The dynamotor, Fig. 12*a*, supplies all the necessary high voltage for the data transmission-display group. It operates on a source voltage of 28 v. and supplies 250 v. output at 0.060 amp. The dynamotor output voltage is filtered external to the dynamotor plug-in assembly.

MAJOR ASSEMBLY (TERMINAL)

In the major assembly Figs. 12*a*, *b* and *c* the below-named parts have the functions as described:

J–1 is a two-pin external plug connection for the 28 v. power source.

J–2 is a fourteen-pin external plug connection for the Keyer Control.

J–3 is a seven-pin external plug connection for the transmitter and receiver connections. It is also used as an external control for the magnetic lock on the dial pulser.

J–4 is a ten-pin external plug connection for the station selector panel.

J–5 is a twenty-six-pin external plug connection for the indicator panel.

J–6 is a twenty-pin internal plug into which the pulse amplifier connects.

J–7 is a fifteen-pin external plug into which the receiver amplifier connects.

J–8 is a fifteen-pin internal plug into which the selector connects.

J–9 is a fifteen-pin internal plug into which the modulator connects.

K–1 is a 20,000-ohm plate current type four-pole double-throw relay which, when energized by the information pulse amplifier, generates a 28-v. pulse, positive to ground.

K–2 is a 20,000-ohm plate current type four-pole double-throw relay which, when energized by the integrating amplifier, is used to route information.

K–3 is a 20,000-ohm plate current type four-pole double-throw relay which, when energized by the first information reset amplifier, is used to control the information reset functions.

K–4 is a 20,000-ohm plate current type four-pole double-throw relay which, when energized by the second information reset amplifier, is used to control the information reset functions.

K–5 is a 20,000-ohm plate current type four-pole double-throw relay which, when energized by the pulse amplifier, is used as part of the information control circuits.

K–6 is a 20,000-ohm plate current type four-pole double-throw relay which, when energized by the pulse amplifier, is used as part of the information control circuits.

K–7 is a 20,000-ohm plate current type four-pole double-throw relay which, when energized by the execute amplifier, is used to control execute information.

K–8 is a 20,000-ohm plate current type four-pole double-throw relay which, when energized by the transmitter keying amplifier, is used to control the operation of the transmitter.

K–9 is a 250-ohm, 28-v. type four-pole relay used as a power relay. It is controlled by a switch on the station selector panel.

K–10 is a 250-ohm, 28-v. type four-pole double-throw relay used to transfer the information circuits from a receiving to a control or sending system. It is energized during control station operation.

K–11 is a 250-ohm, 28-v. type four-pole relay used to complete the station reset functions.

K–12 is a 250-ohm, 28-v. type four-pole relay used to route information. It operates only during simplex operation.

K–13 is a 250-ohm, 28-v. type four-pole rely used to perform an information reset function. It is energized only when resetting the entire indicator information panel.

K–14 is a 300-ohm, 28-v. type single-pole relay used to generate an information control pulse and operates in parallel with the row stepping switch step coil (K21).

K–15 is a 250-ohm, 28-v. type four-pole double-throw relay used to route information. It is energized during station selected operation.

K–16 is a 300-ohm, 28-v. type two-pole double-throw relay used to operate the "00" station selection function.

K–17 is a 300-ohm, 28-v. type three-pole relay used to perform station selection functions. It is energized during station selected operation.

K–18 is a 300-ohm, 28-v. type single-pole double-throw relay used to route transmitter keying information.

K–19 is a 300-ohm, 28-v. type single-pole double-throw relay used to route transmitter keying information and remains energized during control station operation.

K–20 is an add-subtract type 28-v. relay. It steps both clockwise and counter-clockwise and is used to store information pulses during simplex operation.

Row-stepping switch K–21 operates on 28 v. and contains three levels of ten positions each used to route information.

The two column-stepping switches, K–22 and K–23, operate on 28 v. and each contains three levels of ten positions each which are used to route information.

The fuse holder F–1 is of the quick fastener type.

A choke input filter, L2 and C1, is provided on the primary side of the dynamotor, and a choke input filter consisting of L1, C2, and C3 is provided to filter the output of the dynamotor.

S–1 is a single-pole double-throw toggle switch and is used to control the blanking which is applied to the receiver amplifier.

S–2 is a single-pole single-throw switch used to prevent the station selection stepping switch, K–24, from stepping beyond position 3. It is mechanically linked to the shaft of the station selection stepping switch.

S–3 is a double-pole double-throw switch used to change the operation of the terminal unit from simplex to duplex operation.

The station selection stepping switch, K–24, contains one level of ten positions and is used to route the station selection information.

STATION SELECTOR PANEL

The station selector panel, Figure 4, is used to select the code or number to which a display system will respond. It is connected directly to the terminal and controls the primary power circuit of the system.

The station selector panel has four manually operated controls, two ten-position rotary switches, and two "On-Off" switches. The two ten-position switches, in conjunction with two two-level stepping switches, provide the station selection circuits. One of the "On-Off" switches completes the primary circuit of the power relay in the terminal unit. The other "On-Off" switch operates in conjunction with the "General Call" circuit to provide control of the transmitter during "General Call."

The theory of operation is as follows (see schematic, Fig. 5):

(1) Switch S604, the power "On-Off" switch, completes the circuit from pin H of the receptacle P601 to ground, energizing relay K–9 of the terminal which turns on the data transmission-display group.

(2) The selection system of the station selector panel requires that the positions of relay K601 and switch S601 correspond, and that the positions of relay K602 and switch S602 correspond to provide a completed circuit. Assume switches S601 and S602 are in position 1 and represent the setting for station call No. 11. To make the selection circuit complete, one 28-v. pulse on pin C of the receptacle P601 will step relay K601 to position 1. One 28-v. pulse on pin D of P601 will step relay K602 to position 1. This completes the circuit from pin E of P604 through position 1 contact of level A of K602, through position 1 of switch S602, from the center arm of S602 to the center arm of switch S601, through position 1 of S601, and through position 1 on level A of relay K601 to common ground.

(3) For "00" or "General Call" operation the rotary selector switches S601 and S602 remain on the preselected station number. Two series of ten pulses each are received, the first being routed to the stepping coil of relay K601 and the second series of ten being routed to the stepping coil of relay K602. With both K601 and K602 in position 10, the circuit is completed from ground through level B of relay K601 position 10 contact to position 10 contact on level B of relay K602, to the center pole of switch S603, the "General-Call" "On-Off" switch. Switch S603 is normally left in the "Off" position which completes the circuit from level B of relay K602 to pin F of P601 providing a "00" ground on pin F when "00" is the selected call. When the "00" ground is selected, the display system will receive and display information but will not retransmit any information. When switch S603 is in the "On" position, the "00" ground is completed to pin E instead of pin F on P601 and the station will retransmit the information as well as receive and display it.

INDICATOR PANEL

The indicator panel displays all information received by the visual display receiving station. A view of the indicator panel is shown in Figure 3 and a schematic is shown in Figure 6.

The indicator panel contains 13 message registers and 3 lights. The message registers are arranged in three rows of three each and one row of four with the first of the row of four being a prefix or wide drum type message register. The remaining 12 are of the narrow or numerical type message registers. The three lights indicate station selection, information being received, and execute or acknowledge. An acknowledgment push-button is included on the indicator panel to originate the transmission of an acknowledgment signal from a receiving station.

The theory of operation is as follows:

(1) When pin S of receptacle P715 is connected to ground, message registers M701, M702, M703, and M704 will step in accordance with the number of 28-v. pulses applied to each through pins N, M, L, and K of P705, respectively. Applying a 28-v. pulse to pin R will reset message registers M701, M702, M703, and M704 to their blank or reset positions simultaneously.

(2) When pin T of P705 is connected to ground, message registers M705, M706, and M707 will step in accordance with the number of 28-v. pulses applied to each through pins C, B, and A of P715, respectively. Applying a 28-v. pulse to pin R will reset these message registers simultaneously.

(3) When pin U of P705 is connected to ground, message registers M708, M709, and M710 will step in accordance with the number of 28-v. pulses applied to each through pins F, E, and D of P715, respectively. Applying a 28-v. pulse to pin R of P715 will reset these message registers simultaneously.

(4) When pin V of P705 is connected to ground, message registers M711, M712, and M713 will step in accordance with the number of 28-v. pulses applied to pins J, H, and G of P715, respectively. Applying a 28-v. pulse to pin R of P715 will reset these message registers simultaneously.

(5) When pins S, T, U, and V of P705 are grounded and a 28-v. pulse is applied to pin R of P705, all 13 of the message registers will reset simultaneously.

(6) When any one message register completes the circuit between pins 3 and 4 of its plus-in receptacle, 28 v. will be applied to pin Y of P715. This is the originating circuit for the repeat-back information.

(7) Completing the circuit from pin A of P715 to ground will operate indicator light E703.

(8) Completing the circuit from pin P of P715 to ground will operate indicator light E701.

(9) Completing the circuits from pin P of P715 to ground and pin W of P705 to 28 v. will operate indicator light E702.

(10) Depressing switch S701 will apply 28 v. D.-C. to pin Z of 715.

MESSAGE REGISTER (THEORY)

The message register or information indicator, as used in the display system, is an electro-mechanical device which transforms pulsed electrical information into visual information. As hereinbefore stated the unit used is explained in detail in U.S. patent application Serial Number 494,585, filed March 15, 1955, by Francis H. Chartrey for Relay Annunciator.

The complete message register, shown in Fig. 6, consists of two 28-v. D.-C. solenoids with their associated armatures, pawls, and arms required to actuate the rotating and resetting mechanisms of the information drum, two sets of S.P.S.T. (single pole, single throw) relay type contacts, and the drum with its associated spring-loaded returning mechanism. The unit is constructed on a single aluminum plate.

The information is engraved on a drum containing ten numerals and a blank or reset position which are visually displayed through a window that allows only one item of information to be seen at a time.

When a pulse, varying in voltage from 19 to 29 volts, is applied to the stepping electromagnet, the energy (mechanical) is transferred through the step arm to the pawl which engages the ratchet on the drum and causes it to revolve one position, becoming locked in that position by the spring-loaded ratchet arm on the reset electromagnet mechanism. The stepping pulses are approximately 45 msec. long, and the unit steps at a rate of 10½ ±5 percent pulses per second.

The message register is of the positive reset type. A single pulse of 19 to 29 v. applied to the reset electromagnet allows the drum to return to the reset or blank position of the drum in less than 75 msec. During the reset operation, the ratchet arm is lifted from the ratchet and allows the spring-loaded drum to return to its reset position.

The two pairs of S.P.S.T. contacts which are actuated by the step and reset arms are utilized to originate a return pulse for the repeat-back system. The contacts are wired in series, allowing a pulse to be originated when both contacts are closed. This occurs only after a full step sequence has been completed. Assuming that contacts A are mounted on the stepping electromagnet mechanism and those on the reset mechanism are contacts B, the operation is as follows. In a static condition contacts A are open and contacts B are closed. As the stepping arm begins to travel, contacts A start to close; however, before they make contact, contacts B open because the rotation of the drum causes the ratchet to lift the reset arm opening the contacts. With contacts A closed, contacts B remain open until the drum has rotated allowing the reset arm to drop into the next position, at which time contacts B will also close, completing the series circuit, and generating a repeat-back pulse. Careful adjustment of both sets of contacts is necessary for proper operation of the unit.

KEYER CONTROL

The Keyer Control is used with a receiving system to make up a control system. The function of the Keyer Control is to originate and display all information sent out from the control station. The operations of the Keyer Control is controlled by four manually operated controls, three of which are push-button switches and the fourth a dial-pulser. The information displayed on the unit appears on seven message registers and one light. The theory of operation of the message register is described elsewhere in this application.

The Keyer Control is shown pictorially in Fig. 2. From left to right the message registers are used as follows: the first two display the number of the station which is selected; the next one indicates the row on which the information will be displayed; the fourth message register is used only when transmitting on the information row and will indicate the prefix for the information row; the remaining three message registers are used to display all the digital information regardless of what row is selected. The light indicates that an execute control pulse is being sent out from the unit.

The controls have the following functions and are located as follows: The station reset push-button is located in the upper right hand corner of the Keyer Control and is used to reset all circuits in both the control and receiving systems, except the message registers on the indicator panel; the information reset push-button is located in the lower right hand corner and is used to reset any incompelte sequence of information when error has been noted (it is also used in conjunction with the dial-pulser to reset all information displayed on the indicator panel); the execute push-button is located on the lower left hand corner of the Keyer Control and is used to send out an execute control pulse (it also controls the execute light which is located in the upper left-hand corner); the dial-pulser is located in the center of the panel and is used to originate all station selection, row selection, and information pulses.

The circuit operation of the unit as best shown in the schematic diagram in Figs. 7*a* and *b* is described as follows:

(1) The first operation requires depressing the station reset button to assure that all the stations in the operating area are completely reset. Depressing the station reset button S505 energizes relay K509. When relay K509 is energized, 28 v. is supplied to pins 8 and 11 of the external plug, to the reset coils of relays K502, K505, K506, and to message registers M501, M502, M503, M504, M505, M506, and M507.

(2) The second operation requires dialing the first digit of the desired station's code number. Operating the dial-pulser first places a 28-v. pulse through switch S502, equal in time length to the entire train of pulses originated by the dial on relay K508, energizing it. This steps relay K502 to position 1. Releasing the dial originates the train of pulses from switch contacts S501 which pulses relay K507. Each time relay K507 is pulsed or energized a 28-v. pulse is applied to pins 5 and 7 of the external plug P–508, and to the stepping coil of message register M501 through position 1 contact of relay K502-level A.

(3) Dialing the second digit of the desired station's code number first steps relay K502 to the second position and then sends the pulses to the stepping coil of message register M502.

(4) The third operation selects the row on which the information is to be displayed. This is accomplished by dialing the number corresponding to the desired row as indicated on the dial-pulser. Dialing the row selection number steps relay K502 to position 3. Level B of relay K502, which is also stepped to the third position, routes a 28-v. pulse originated by switch S502 on the dial-pulser to relay K512, energizing it and in turn sending a 28-v. pulse to the stepping coil of relay K506, stepping it to the first position. With relay K502 in the third position, the information pulses which are originated by switch S501 of the dial-pulser are routed to level A of relay K506 and through position 1 contact of that level to the stepping coil of relay K505 and message register M503, stepping the relay into the selected row position and the message register to indicate the selected row.

(5) The next operations place the information on the message registers and are accomplished by dialing the information as read from left to right. The first information on row 1 (the information row) will be the prefix, while the first information placed on rows 2, 3, or 4 (range, bearing, or altitude) will be the first of three numerals.

When dialing the first information sequence on row 1, a 28-v. pulse routed through contacts on relay K512 first steps relays K502 and K506 to the next position. The pulses originated by switch S501 on the dial-pulser are then routed through level A of relay K502, to level A of relay K506, through position-2 contact of relay K506-level A, and through position-1 contact of relay K505 to level C of relay K506. The pulses are then routed through position-2 contact of relay K506-level C to the stepping coil of message register M504, the prefix indicator. Dialing the first numeral on row 1 routes the pulses through position-3 contact on level C of relay K506 to message register M505. Dialing the second numeral on row 1 routes the pulses through position-4 contact on level C of K506 to message register M506, and the pulses for the third numeral are routed through position-5 contact on level C of relay K506 to message register M507, completing the displayed information on row 1.

When transmitting information to be displayed on rows 2, 3, or 4 (bearing, range, or altitude), dialing the first numeral closes S502, energizing relay K508. The contacts of relay K508 route 28 v. to relays K502 and K506, stepping them to the next position. The pulses which are originated by switch S501 on the dial pulser are then routed by means of relay K507 through level A of relay K502, to level A of relay K506, through position-2 contact of relay K506-level A, through position 2, 3 or 4 contact of relay K505, to level B of relay K506 and through position-2 contact to the stepping coil of message register M505. Dialing the second numeral on row 2, 3, or 4 routes the pulses through position-3 contact on level B of relay K506 to message register M506, and the pulses for the third numeral are routed through position-4 contact on level B of relay K506 to message register M507, completing the displayed information for rows 2, 3, or 4.

(6) When dialing the third numeral on any row the information pulses also energize relay K510, which in turn energizes relay K511. Relay K511 remains energized due to a self-holding contact which obtains its power through switch S508, the "Off-Normal" switch on relay K506. After the third numeral has been dialed and the dial returns to its rest position, switch S502 on the dial pulser opens, de-energizing relay K508. This removes the 28 v. on the coil of relay K512 which is obtained from the contacts of relay K508 through level B of relay K502. De-energizing relay K512, routes 28 v. to the reset coils of relays K505 and K506 through contacts on the now energized relay K511. This reset stepping relays K505 and K506 which opens "Off-Normal" switches S504 and S508. Opening these switches breaks the circuits to relays K503 and K511, deenergizing them.

(7) After having transmitted a sequence of information, to transmit information on another row or change the information on the row previously dialed, the operator needs only to dial the row desired. Starting the dialing operation closes switch S502 on the dial pulser and energizing relay K508. This relay routes 28 v. to level B of relay K502, through contacts on relays K503, K509, and K513 to the reset coils of message registers M503 M504, M505, M506, and M507, the row, prefix, and information indicators. This resets the message registers so that new information may be displayed. This reset operation is automatic and will not change the row selection operation as described in preceding paragraph 4.

(8) Depressing the information reset switch S507 energizes relay K513 which routes 28 v. to pin 11 of receptacle P508, to the reset coils of relays K505 and K506, to the reset coils of message registers M503, M504, M505, M506, and M507, and completes the circuit from pin 12 of receptacle P508 to ground. This resets the row message register, the information message registers, the row-stepping relay K505, and the column-stepping relay K506.

(9) Depressing the execute switch S506 energizes the execute light on the front panel of the Keyer Control, routes 28 v. to pin 11 of the receptacle P508, and completes the circuit from pin 14 of receptacle P508 to ground.

(10) Pin 15 of the external plug P502 normally has 28 v. applied to it. This 28 v. is routed to the magnetic brake mounted on the back of the dial pulser. When the 28-v. supply is removed from pin 15 of P508, the magnetic brake de-energizes, locking the dial release mechanism and stopping the operation of the dial pulser.

SIMPLEX OPERATION

Figure 13 is the cabling diagram for simplex operation of the display system.

The data transmission-display link, which is comprised of one control station and one or more receiving stations operating on a single R-F carrier frequency (simplex), has the following sequence of operation:

(*e.1*) *Selection of station desired.*

(*e.1.1*) *Transmission of station reset.*—Depress station reset push-button to assure that all the receiving stations on the same R-F frequency in the area are in the reset position awaiting station selection. Depressing the station reset push-button energizes circuits as described under "Keyer Control Theory," placing a positive 28 v. on pin D and ground on pin J of receptacle J508 of the terminal. Since K–19 and K–10 are energized during control station operation, the positive 28 v. on pin D of J–2 is applied to K–18, energizing it, and applying, in turn, a positive 28 v. to pin N of P401 through normally closed contacts on K–12. As described in the paragraph of *d.9* of the terminal theory, the positive 28 v. on pin N of P401 energizes K–8, the transmitter keying relay, which, in turn energizes the keying relay in the transmitter through pin G of J–3. The ground applied to pin J of J–2 is coupled to pin 1 of P301. As described in paragraph *c.2*, the ground applied to pin 1 of P301 causes a 21-kc. frequency to be generated and applied to pins 4 and 6 of P301 which is, in turn, coupled to pins D and J of J–3. This signal is coupled to the transmitter, modulating the transmitter while it is being keyed by K–8.

(*e.1.2*) *Reception of station reset.*—All receiving stations in the area which are set to receive the R-F frequency of the control station will receive and demodulate the signal which is transmitted at the control station. This demodulated signal is coupled from the receiver by each receiving station to pin L of J–3 of the terminal. From pin L of J–3, the signal is routed through pin 14 of J–7 and P101, the input of the receiver amplifier unit. As described in paragraphs *a.1*, *a.2*, *a.3*, and *a.4*, this signal is amplified and applied to pin 13 of P201 through pins 5 and 7 of P101. As described in paragraphs *b.1*, *b.2* and *b.3* the signal of 21 kc. is changed to a positive 28 v. which is applied to pin 2 of P201. This positive 28 v. is applied to K–11 through a pair of normally closed contacts of K–10, energizing relay K–11. Relay K–11 applies positive 28 v. to the reset coils of stepping switches K–21, K–22, K–23, and K–24 and also to the reset coils of K601 and K602 through pin G of J–4 and the external plug connection of the station selector panel; thus returning the aforementioned stepping switches to their reset positions. This completes the station reset operation because no station reset signals are retransmitted from the receiving stations.

(*e.2*) *Transmission of station selection information.*—Set station selector panel switches to the desired station's call number. The next operation requires dialing the tens digit of the desired station's call number. As described in paragraph 2 of the "Keyer Control" section, dialing the tens digit operates circuits within the Keyer Control, indicates on the local tens station-selector indicator M501, and also applies positive 28 v. to pins A and B of J–2 on the terminal unit. The positive 28 v. on pin B of J–2 is routed to pin 19 of P401 through normally closed contacts on relay K–17. As described in paragraph *d.3*, applying positive 28 v. to pin U of P401 operates the information pulse amplifier which keys relay K–1. Since a selected ground is required to energize relay K–15 and the station selection relays K–24, K–601, and K–602 are in the reset position which will not provide a selected ground, the positive 28-v. signal originated by K–1 will be routed through the normally closed contacts on relay K–15 to the common contact on level A of relay K–24. The positive 28 v. on pin A of J–2 is routed through a pair of normally closed contacts on relay K–15 to pin R of P401. As described in paragraph *d.10*, the 28 v. on pin R of P401 will operate the integrating amplifier which energizes relay K–2. Since switch S–3 is in the simplex position, a circuit will be completed to selected ground from relays K–12 and both coils on K–20. However, it is to be noted that selected ground will not be available until the station has been selected; therefore, relays K–12 and K–20 will not operate.

When energized, K–2 will supply positive 28 v. to K–12 (which will remain de-energized until the station is selected), to the stepping coil of K–24 (which will step this relay to position 1), and to a set of normally open contacts on relay K–5. With stepping relay K–24 in position 1, the pulses supplied from relay K–1 will be routed through level A of K–24, through pin C of J–4 to the station selector panel pin C of the external plug to the stepping coil of relay K–601. This steps K–601 in accordance with the number of the tens digit.

The positive 28 v. on pin A of J–2 is also routed through a pair of contacts on relay K–10, through contacts or relay K–18, through contacts on K–12, and through pin N of P401 to the transmitter keying amplifier. As described in paragraph *d.9*, the transmitter keying amplifier energizes relay K–8 which supplied a selected ground for pin G of J–3, the transmitter keying lead, thus keying the transmitter. The positive 28 v. on pin A of J–2 is also routed through a pair of contacts on relay K–10, through a pair of normally closed contacts on relay K–6, and through pin L of P401 to the space amplifier. As described in paragraph *d.8*, the space amplifier will energize relay K–5 which, in turn, supplies a positive 28 v. to pin 8 of P401 operating the pulse amplifier in accordance with paragraph *d.7*. Operation of the pulse amplifier energizes K–6. The waveforms of Fig. 15 show the operational sequence of relays K–5 and K–6.

When relay K–5 is energized, a 28-v. pulse is applied to pin J of P401. This pulse is lengthened 45 msec. by the pulse amplifier which energizes K–6. The resultant pulse or difference between the time K–6 and K–5 are energized is used to complete a ground from K–6 through normally closed contacts on K–5 and K–12 to pin 3 of P301. As described in paragraph *c.2*, relay K–302 will operate, generating a 25-kc. signal which is amplified and applied through pins 4 and 6 of P301 to pins A and F of J–3. Assuming the first digit of the desired station call is 5, waveform of Fig. 16 shows the relationship of the applied transmitter keying pulse and the applied modulation.

The following are the time durations of the wave form of Fig. 16.

Keying (keying)
Transmitter:
- Transmitter pulse—495 msec.
- Modulation pulses—45 msec.
- Spaces between pulses—50 msec.
- Before modulation—30 msec.
- After modulation—40 msec.

(*f.1*) *Reception of station selection information.*—The station selection information described in paragraph *e.2*, is received by all receiving stations in the area which are tuned to the R-F frequency of the transmitting station. Since the first pulse (modulation) of the waveform is preceded by 30 msec. of R-F carrier (unmodulated) from the transmitting station, the receiver has sufficient time to attain an automatic volume control (AVC) level large enough in magnitude to limit the sensitivity of the receiver allowing the modulation pulses to be demodulated. The output of the receiver is coupled to terminal pin L of J–3. The signals are routed from pin L of J–3 to pin 14 of P101, the input of the receiver amplifier. As described in paragraphs *a.1*, *a.2*, *a.3*, and *a.4*, the signals are amplified sufficiently to be routed through pins 5 and 7 of P101 to pin 13 of P201, the input of the selector unit. As described in paragraphs *b.1*, *b.2*, and *b.3*, the 25-kc. pulse signals will operate relay K202 applying 28-v. positive pulses to pin 4 of P201 and removing the 28-v. positive from pin 12 of P201 for the duration of each pulse. The positive 28-v. pulses applied to pin 4 of P201 are routed to pin R of P401. The positive 28-v. pulses applied to pin 4 of P201 operate the integrating amplifier which energized relay K–2. K–2 will complete circuits as will be described in the "K–2 Relay" section. The signal which appears on pin 12 of P201 (removing positive 28 v. during signal pulses) is routed to pin T of P401. As described in paragraph *d.3*, relay K–1 will be energized when the 28-v. positive is reapplied to pin P of P401. As will be described in the "K–1 Relay" section, relay K–1 will operate stepping switch K–601 in the station selector panel, stepping it to correspond with the number of 25-kc. pulses transmitted from the controlling station. This completes the selection of the tens digit of station selection. No station selection information is retransmitted from a receiving station.

(*f.2*) The next operation requires the transmission of the station selection units digit. Assuming the units digit is 4, giving the desired station a call number of 54, the operator then dials a 4 on the dial pulser of the Keyer Control. The selection of the units digit is the same as the selection of the tens digit (paragraph *e.2* and *f.1*) except that the units information or pulses are routed to the units selection circuits. In the terminal at the transmitting station, relay K–24 will step to position 2 and the units pulses will be routed through position 2 of level A to pin D of J–4, through pin D of J–60 of the selector panel to the stepping coil of K–602. This procedure will also be followed in the terminals of the receiving stations.

(*f.3*) Since the rotary switches S601 and S602 of the station selector panel on both the control and receiving station have been set to 54, the call number of the receiving station, and the stepping switches K601 and K602 have been stepped to 5 and 4, respectively, the circuit from pin E of J–604 in the station selector panel of both the control and receiving station is completed through level A position 4 of K602, through contact No. 4 of rotary switch S–602, through the rotary contact of switch S–602 to rotary contact of switch S–601, through contact No. 5 or S–601, through position 5 of level A of K–601, through the common contact of level A of K601 to chassis ground. This completes the circuit from pin E of J–3 to ground, energizing relay K–17. Relay K–17 when energized completes the circuits from all selected ground points to the common chassis ground. It also removes the holding positive 28 v. from the magnetic brake on the dial pulser and opens the station selection circuit on the terminal unit of the control station.

Relay K–15 will be energized continuously after station selection, because relay K–2 is de-energized, placing a positive 28 v. on the coil of relay K–15 which is completed to ground (common) through relay K–17, the selected ground relay. Once energized, K–15, the transfer relay, will remain energized as long as the selected ground is completed to common ground, because a continuous 28 v. positive is supplied to the coil by a pair of its own contacts. This completes the station selection operation.

(*g.1*) *Transmission of information to the selected station.*—Referring to the "Indicator Panel" theory of operation, information transmission is accomplished as follows:

(*g.1.1*) Dial the number corresponding to the row on which information is to be placed. The names of the rows are visible in the center of the dial adjacent to the numbers. As described in paragraph 3, "Keyer Control" section, dialing the row operates the row circuits within the Keyer Control and also places positive 28-v. pulses on pins 5 and 7 of J–508. These pulses are coupled to pins A and B of J–2 of the terminal unit. The pulses on pin B of J–2 are routed to contacts on K–17 which during information transmission are open, deleting the use of the pulses to key the information pulse amplifier. The pulses on pin A of J–2 are routed, as described in paragraph *e.2*, with the exception that relay K–15 is energized and opens the keying circuit for the integrating amplifier.

(*g.2*) *Reception of the row selection information.*—In energizing relays K–1 and K–2 the reception of row selection information is the same as the reception of station selection information as described in paragraph *f.1*. K–15 and K–17 are energized during row selection.

(*g.2.1*) K–2 when energized operates circuit as follows:

(*g.2.1(a)*) Applies positive 28 v. to relay K–12 which has its ground circuit completed by relay K–17 through switch S–3, thus energizing K–12.

(*g.2.1(b)*) Applies positive 28 v. to contacts C on relay K–15, which being energized routes the 28 v. positive to the stepping coils of relay K–22 and K–23 (the column selection stepping switches) which having their ground circuits completely by relay K–17, step to position 1.

(*g.2.2*) Relay K–1 completes circuits as follows:

(*g.2.2(a)*) Applies positive 28 v. to contacts D on relay K–15 which, being energized, routes the signals to level 5 of the column stepping switch which, being in position 1, routes the signals to the step coil of K–21, the row stepping switch, and the coil of relay K–14, the row repeat-back relay; both circuits being completed to ground by selected ground relay K–17. Relay K–21 is stepped and relay K–14 is pulsed in accordance with the number of pulses generated by relay K–1, which is controlled by the pulsed modulation of the incoming signal. Relay K–14 being in parallel with the stepping coil of K–21 is energized each time K–21 is stepped, and generates a positive 28-v. pulse each time it is energized.

These pulses are routed through contacts D on relay K–12, which is presently energized, to contacts D on K–2 which is also energized, to contacts B of K–10 which is de-energized, to contacts on K–18 and K–6. K–18 is not energized, so the information is routed through contacts C on K–12, to pin N of P401 operating the transmitter keying amplifier, as described in paragraph *d.9*.

(*g.2.2*(*b*)) The positive 28 v. applied to contacts C on relay K–6, which is de-energized, is applied to pin L of P401 and operates the space amplifier in accordance with paragraph *d.8*, which energizes relay K–5. K–5 being energized applies positive 28 v. to pin J of P401 which operates the pulse amplifier in accordance with paragraph *d.7*, which operates relay K–6. As described in paragraph *e.2*, relays K–5 and K–6 produce waveforms as shown in Fig. 15. These are used to operate relays K–20 and K–302 (K–302 operating only during transmission). During the selection of a row, the add coil is energized by contacts D on relay K–5 which obtain 28 v. from contacts on K–2 in its energized position. The K–5 D contacts obtain positive 28 v. from contacts A of relay K–2 which is energized during row selection. The ground circuit of relay K–20 add coil is completed through switch S–3 to selected ground, to common ground through K–17. Thus, the add coil of K–20 is energized each time relay K–14 energizes, allowing relay K–20 to step to the same position as relay K–21, the row stepping switch. This completes the transmission and reception of the row selection information.

(*g.3*) *Retransmission of row selection information.*—160 msec. after the last pulse has been received from the transmitting station, relay K–2 will de-energize allowing 28 v. from contacts on relay K–20, which are closed when K–20 is stepped off zero position, to be routed through normally closed contacts on relay K–2 and K–10, through contacts on relay K–6, through pin L of P401 to the space amplifier, and from the same contacts on relay K–10 through contacts on relay K–18, through contacts on relay K–12, through pin N of P401 to the transmitter keying amplifier. The space and pulse amplifiers will operate as described in paragraphs *d.7* and *d.8*. The transmitter keying amplifier will operate in accordance with the theory as described in paragraph *d.9*. Since a continuous 28-v. pulse is supplied by the contacts on relay K–20 until it has stepped back to its zero or rest position, the space and pulse amplifier will continue to function until this requirement is fulfilled. Relay K–20 is stepped by its subtract coil to zero position by a 28-v. pulse generator by K–6, routed through normally closed contacts on relay K–5, through normally closed contacts on relay K–12 to the subtract coil. Relay K–20 requires the same number of pulses to subtract as it does to add; therefore, the retransmission will contain the same number of pulses as the pulse train which was applied to the add coil of K–20.

(*g.4*) *Reception of retransmission at the control station.*—After K–2 de-energizes, 28 v. will be routed through the common contactor on column 6 of relay K–22, through position 1, to the common contactor on row 1 of relay K–21, through position 1, 2, 3, or 4 depending on and corresponding to the row which was selected, to the corresponding common contactor on relays K–23 or K–22 and through position 1 of the selected column to pin R of J–5. This 28 v. is then routed to the indicator panel and to the one terminal of all the reset coils on the message registers which are in parallel. The selected row will have the other terminal of the reset coils returned to selected ground through the cable and a position on row 2 which corresponds to row 1. This resets any information which might be displayed on the message registers of that particular row allowing the new information to be placed on the registers.

The retransmitted information will be received by the receiver at the control station, demodulated and routed to pin L of J–3 of the terminal unit. From pin L of J–3 of the terminal unit, the signals are routed through the receiver amplifier unit to the selector unit as described in paragraph *f.1*. However, the signals being of 25-kc. modulation will operate the information channel relay K202 in the selector unit. Positive 28-v. pulses are coupled from relay K–202 through pin 4 of P201 and pin R of P401 to the integrator amplifier, operating the amplifier and energizing relay K–2. Negative pulses, 28 v. in amplitude and referenced to the 28-v. positive line, are generated by relay K202 and are routed through pin 12 of P201 and pin T of P401 to the information pulse amplifier, which energizes relay K–1. The following functions are performed by relays K–1 and K–2 in the sequence of their operation:

*Relay K–2*

(1) Routes 28 v. to a contact on relay K–5.

(2) Routes 28 v. to relay K–12, which will not energize, because the simplex-duplex switch S–3 is in the duplex position breaking the circuit to ground.

(3) Routes 28 v. through contacts on relay K–15 to the step coils of relay K–21, K–22, and K–23, stepping them to the next position.

(4) Completes the circuit from contacts on relay K–10 to open contacts on relay K–12, which is not energized and therefore does not complete the circuit.

*Relay K–1*

(1) Generates 28-v. pulses which are routed through contacts on relay K–15 to level 5 of column stepping switch K–22 through position 1 of level 5 of K–22 to relay K–14 and the step coil of relay K–21, pulsing K–14 in accordance with the number of pulses received, and stepping K–21 to the position corresponding to the number of pulses received. Relay K–14 generates 28-v. pulses which are routed to switch S–3, which is open, and the contacts on relay K–12 which is also deenergized and an open circuit.

With the completion of the functions of relays K–1 and K–2, the reception and use of the retransmitted row information is completed.

(*h.1*) *Transmission of information on the selected row.*—To send information on row 1 or the information row follow the operator's procedure as given below:

SEQUENCE OF OPERATIONS

*To select a station*

(1) Turn the "tens" and "units" knobs on the station select panel to the desired station's call number.

(2) Depress station reset.

(3) Dial the "tens" digit of the desired station's call number.

(4) Dial the "units" digit of the desired station's call number.

(Example: To select station 76, first dial a "7," then a "6.")

*To select a row*

(1) Dial "1" for the information row, "2" for bearing, "3" for range, "4" for altitude. Rows may be selected in any sequence.

*To send information*

(1) If row 1 has been selected:

*a.* Dial the numeral corresponding to the code on the wide message register. Printed codes are on the Keyer Control case adjacent to the edge of the dial.

*b.* Dial the first digit.

*c.* Dial the second digit.

*d.* Dial the third digit.

(2) If row 2, 3, or 4 has been selected:

*a.* Dial the first digit.

*b.* Dial the second digit.

*c.* Dial the third digit.

To reset information (1) If an error in information in any row is noted before the last digit of the row has dialed:

*a.* Depress the information reset button.

*b.* Dial the row again.

*c.* Dial the information in accordance with the procedure of the above paragraph, "To Send Information."

(2) If an error in information in any row is noted after the last digit of the row has been dialed:

*a.* Dial the row again.

*b.* Dial the information in accordance with the procedure of the above paragraph, "To Send Information."

(3) If it is desired to erase the information displayed on all the message registers of the receiving station's indicator unit:

*a.* Dial a "zero."

*b.* Depress the information reset button.

To send an "execute" signal (1) Depress the execute button on the Keyer Control.

To acknowledge receipt of information at a selected receiving station (1) Depress the acknowledge button on the indicator panel.

(*h.1.1*) The next operation requires dialing the first bit of information to be displayed. In the case of row 1, the information row, this will be the prefix; on rows 2, 3, or 4 (bearing, range or altitude) it will be the first column. The transmission of the information is the same as the row selection, paragraph *g.1.1*, with different routing of the information within the terminal units at each station. At the transmitting station there are no changes in the transmission procedure.

(*h.1.2*) *Reception of information.*—The information is received in the same manner as row selection information, paragraph *g.2*, with the following exceptions:

(*h.1.2(a)*) K–22 being in position 2, the pulses formed by relay K–1 are routed to the common contact of row 1 on relay K–21 and depending on its position to the various levels of relays K–22 and K–23 to the step coils of the message registers on the indicator panel.

(*h.1.2(b)*) All the repeat-back contacts on the message registers are in parallel, so that when a message register steps a position a 28-v. pulse is generated and routed to J–5, pin Y. These pulses are routed and used the same as pulses generated by relay K–14, as described in paragraph *g.2.2(a)*.

(*h.2*) *Retransmission of row information.*—The retransmission of row information is the same as row selection information, described in paragraph *g.3*.

(*h.3*) *Reception of retransmission at the control station.*—Reception of the row information is the same as described in paragraph *g.4*, with the following exceptions:

(*h.3.1*) Pulses which are generated by K–1 will be routed through position 2 on level 5 of relay K–22, the common contactor on level 1 of the row relay K–21, to the various levels of K–22 and K–23 depending on the position of relay K–21, and to the indicator panel. The repeat-back pulses are not used because S–3 is open, as described in paragraph *g.4*. This completes the transmission of one bit of row information.

(*i.1*) Dialing a second time transmits the second column of information, in the case of rows 2, 3, or 4 and the first column in the case of row 1. All signals are routed as described in paragraph *h.1.2*.

(*j.1*) *Transmission of information on column 3 of any row.*—After the transmission of the third and final column of information, it is necessary to return the selector relays in the terminal unit to their reset positions so information may be transmitted on a different row or retransmitted on the same row without requiring the added operation of manually resetting the relays. This is accomplished in the following manner:

(*j.1.1*) The third column is transmitted and received the same as the second column as described in paragraph *i.1*. After being received at the receiving station, the information is routed to the pulse and integrating amplifiers similar to other signals. These pulses then operate relays K–1 and K–2. The information pulses are routed as described in paragraph *h.1.2*.

(*j.1.2*) The circuit which is used to reset the row- and column-stepping relays is a combination between row 3 of K–21 and column 6 of K–22.

(*j.2*) When dialing the third column of information on the bearing, range, or altitude rows, the circuit will be completed from the common contactor on column 6 of relay K–22 through position 4, to either position 2, 3, or 4 of row 3 of relay K–21, to its common contactor which is connected to pin U of P401. When relay K–2 becomes de-energized after the third column of information has been transmitted, 28 v. from a pair of normally closed contacts on relay K–2 will be applied through column 6 of relay K–22, through row 3 of K–21, to pin U of P401. This 28 v. at pin 20 of P401 is routed to the grid of V403–B, part of the second information reset amplifier, causing the reset amplifier to operate. This energizes relay K–4, which in turn applies 28 v. to the reset coils of relays K–21, K–22, and K–23, resetting them.

(*j.3*) After the retransmission of the third column of information has been received at the control station the procedure in paragraph *j.1*, will be repeated.

(*j.4*) Paragraphs *j.1* and *j.2*, completes the operation which leaves the terminal units of the receiving and control stations in a reset position which will allow the transmission of information on another row or on the same row without manually resetting the circuits.

(*k.1*) Thus far a station has been reset and selected, and information has been transmitted on a selected row. Some of the various operations which the equipment is capable of performing are as follows:

(*k.1.1*) *Execute.*—A visual indication may be sent to inform the recipient when to use the received information or to acknowledge that new information has been observed. This requires depressing the execute button on the Keyer Control. This will illuminate the execute light on the Keyer Control panel and also send 28 v. to pin D of J–2 and complete the circuit to ground from pin F of J–2. The 28 v. on pin D of J–2 energizes relay K–18, which in turn routes 28 v. through normally closed contacts on relay K–12, through pin N of P401 to operate the transmitter keying amplifier. This energizes relay K–8 which in turn keys or operates the transmitter. The ground which is applied to pin F of J–2 is routed through contacts on relay K–10, through pin 7 of P301 and energizes relay K–304 which operates the 33-kc. oscillator of the modulator unit. The 33-kc. signal is routed through pins A and F of J–3 to the transmitter.

(*k.1.2*) *Reception of the execute signal.*—The execute signal being 33 kc. is routed to the selector unit and energizes relay K–204 which in turn applies 28 v. to pin 8 of P201. This 28 v. is then routed to pin F of P401 to the input of the execute amplifier, operating it. This energizes relay K–7 which applies selected ground to pin A of J–5 to the indicator panel, illuminating the execute light.

(*k.1.3*) *Retransmission of the execute signal.*—Relay K–7 also applied selected ground through contacts on relay K–10 to relay K–304 operating the 33-kc. oscillator, the output of which is routed to the transmitter. Relay K–7 applies 28 v. through contacts on relay K–19 to relay K–18, energizing it. Relay K–18 routes 28 v. through contacts on relay K–12 to pin N of P401 operating the transmitter keying amplifier. This operates relay K–8, keying the transmitter.

(*k.1.4*) By depressing the acknowledge button on the indicator panel the recipient will apply 28 v. to pin Z of J–5 which will be routed to pin F of P401 and the operation of paragraphs *k.1.2* and *k.1.3*, will be repeated. This operation will take place only when the receiving station is selected.

(*k.1.5*) *Reception of the retransmission of execute or the transmission of acknowledge.*—Reception of the 33-kc. signal at the control station is the same as described in paragraph *k.1.2*.

(*l.1*) Resetting or erasing of information.

(*l.1.1*) The information may be reset one row at a time or the entire indicator panel (four rows) at once. The information on one row may be reset automatically or manually. When errors are noted in a transmission the row may be erased and started over. The following procedures are used:

(*l.1.1.1*) To reset information on one completed row, dial the desired row. This resets the message registers and the stepping relays K–21, K–22, and K–23. This operation at the control station will be the reception of a retransmission to provide a check on the operation.

(*l.1.1.2*) Each time a row is selected, the information on that row is automatically reset so further information may be dialed.

(*l.1.1.3*) To erase the entire indicator panel dial a zero and depress the information reset button. This energizes relay K–13 in the terminal unit and allows all the message registers to be reset. This operation at the control station will be followed by the reception of a retransmission to provide a check on the operation.

(*l.1.1.4*) To erase a row when an error has been noted in a transmission depress the information reset button and redial the row and information. This procedure may be followed only if the third column has not been transmitted. If the third column has been transmitted, redial the row. This will reset the information and the correct information may then be placed on the registers.

DUPLEX OPERATION

Figure 14 is the cabling diagram for duplex operation of the data system. A sequence of operation for operators is given in paragraph *h.1*.

The data transmission-display link, which is comprised of one control station and one or more receiving stations operating on two R–F carrier frequencies (duplex), has the following sequence of operation:

(1) All transmissions on duplex operation are identical to those on simplex operation described in the "Simplex Operation" section.

(2) All retransmissions of information on duplex operation are achieved on a secondary frequency and are therefore retransmitted almost simultaneously with the transmission from the control station. The simplex-duplex switch S–3 in the terminal unit of the receiving station is placed in the duplex position disabling the pulse storage relay K–20, and relay K–12. This permits the information to be retransmitted directly on the secondary frequency.

(3) Transmission and retransmission time on simplex and duplex operation is unchanged for execute and information reset, although the retransmission is still effected on the secondary frequency.

SUMMARY OF OPERATION SEQUENCE

The foregoing has presented operation of the units on an individual basis including structure and operation of each unit and general "dial" manipulation by an individual to effect particular functions. The operational sequence throughout the apparatus on effecting functions is described below:

*A. Resetting of station selection circuits*

(1) To begin operation of this equipment all stations must be reset and made ready to receive the new information. This is done by pressing the station reset button, S–505, in the data transmitter control. This causes 28 volts to be applied to pin D of connector J–2 in the translator which energizes K–18 in this unit. Closing of the contacts of K–18 causes 28 volts to be applied to the plate of V410 in the pulse amplifier unit. This voltage on the plate of V410 causes a positive pulse to be developed across the cathode resistor and is in turn coupled to the grid of V402 causing it to conduct. Conduction of V402 causes plate relay K–8 in the translator unit to energize. Closing of the contacts of K–8 causes a ground to be applied through the normally closed contacts of K–16 and pin B of connector J–3 to the keying relay of the transmitter thus energizing the radio frequency carrier.

(2) Simultaneously with the keying of the radio frequency carrier by pressing S–505 (the station reset button) a ground is completed by this switch through pin J of connector J–2 and pin 1 of connector J–9 to relay K–301 in the modulator unit. Energizing of the relay causes channel 1 (the station reset channel) to begin oscillations and modulates the radio frequency carrier with the proper tone.

(3) Reception of this tone in the controlled stations causes K–201 in the selector unit to energize. Energizing of K–201 causes 28 volts to be placed across K–11 (the station reset relay) through the normally closed contacts of K–10. Energizing of K–11 causes 28 volts to be placed on the reset solenoids of all of the stepping switches in the translator unit and the code selector unit, causing them to reset.

(4) In addition to the above, pressing of the station reset button S–505 completes the circuit of relay K–509 to ground causing it to energize and causing 28 volts to be applied through its contacts to all of the reset solenoids of all of the stepping switches and annunciators in the data transmitter unit. Still another function of the station reset button through the closing of K–8 is to cause a ground to be placed on the grid input of V–102 in the receiver amplifier unit which acts as a blocking signal to prevent the transmitted signal from entering the equipment through the receiver.

B. *Selection of stations*

(1) To select the desired station dial the two numbers assigned to the desired station.

(2) Initial movement of the dial causes K–508 in the data transmitter to be energized through the closing of S–502 on the dial and applies 28 volts to the stepping solenoid of K–502 (the station select stepping switch) causing the stepping switch to advance 1 position.

(3) Relaxation of the dial causes K–507 in the data transmitter to be pulsed the number of times corresponding to the number dialed through the action of S–501 on the dial. The pulsing of K–507 applied 28 volts through the wiper arm and contact number 1 of K–502 to the stepping solenoid of the tens annunicator M–501 in the data transmitter causing it to revolve to the number corresponding to the number of pulses dialed.

(4) In addition to the above action pulsing of K–507 by the dial causes 28 volt pulses to be applied through pin A of J–2, the energized contacts of K–10, the normally closed contacts of K–18, the normally closed contacts of K–12, to the plate of V–410. The pulses are coupled to V–402 causing V–402 to conduct energizing its plate relay K–8. The contacts of relay K–8 completes the ground circuit for the transmitter keying relay through the normally closed contacts of K–16 and thus provides a radio frequency carrier for the pulsed information tones.

(5) The same 28 volt pulse from pin A of J–2 is applied through a pair of energized contacts of K–10 through normally closed contacts of K–6 to the plate of one-half of V–409 (the space circuit). This pulse is coupled through the cathode resistor to one-half of V–401 causing V–401 to draw current energizing its plate relay K–5 (the space relay). Closing of K–5 causes 28 volts to be applied to the plate one-half of V–409 (the pulse circuit) and through its cathode couples the signal to one-half of V–401 causing V–401 to draw plate current through its plate relay K–6 (the pulse relay) energizing it. Energizing of K–6 removes the signal to the space circuit causing its relay K–5 to de-energize. The de-energizing of K–5 in turn removes the signal from the pulse circuit causing its relay K–6 to be deenergized thus completing one pulse, through this pulse forming circuitry. This sequence will be repeated for each pulse.

(6) It should be noted that during the brief time that both K–5 and K–6 are energized a ground will be placed on the dial pulse oscillator relay in the modulator unit through the closed contacts of K–6, K–5, K–12 and pin 3 of J–9. This completes the circuit of K–302 and causes a tone pulse to be transmitted over the already keyed radio frequency carrier.

(7) Reception of these pulses in the controlled stations performs two functions. The first pulse to pass through the channel two selector energizes K–202 in the selector unit. Energizing this relay applies 28 volts to the plate of the cathode follower V–410*b*. The long time constant in the cathode circuit of this tube will cause the integrator tube to continue to conduct for approximately three-tenths of a second after the last pulse of a series is received. Conduction of this tube causes K–2 (the integrator relay) to be energized and remain energized during the remaining pulses. Closing of relay K–2 causes 28 volts to be applied to the stepping solenoid of the station tens-units relay (no number) and causes it to advance one step to the tens position.

(8) In addition to the above, the first pulse and the succeeding pulses of a series causes one set of contacts on K–202 to open which removes 28 volts from the grid of V–405A. This causes V–405A to be cut off by the 28 volts positive on the cathode. This in turn causes a positive pulse on the plate of V–405 to be coupled to the grid of V–403. This allows V–403 to draw plate current through K–1 (information pulse relay) causing it to pulse in accordance with the incoming signal. Pulsing of K–1 causes 28 volts to be fed through the normally closed contacts of K–15, through the sliding arm and contact number 1 of the tens-units relay and pin C of J–4 to the stepping solenoid of K–601 (the tens relay) in the code selector unit and causes it to advance to the position corresponding to the number dialed.

(9) The sequence is repeated for the second number of the station to be dialed except the action of K–507 causes K–502 (the station select relay) in the data transmitter, and (through the action of the integrator circuit) the tens-unit relay in the translator to advance to the units position (position number 2), thus causing the second series of pulses to be applied to the units annunciator and stepping switches respectively.

(10) This completes the station selection, and the station whose manual switches S–601 and S–602 correspond to the two numbers dialed will supply "selected ground" (selected ground is marked with a triangle instead of the conventional ground symbol) to its circuits by completion of the circuit of K–17 through pin E of J–4, K–602, S–602, S–601, and K–601 to ground.

C. *Transmission of information*

(1) With the station selection accomplished as above and "selected ground" applied to all necessary circuits in the selected station, information can now be sent to this selected station.

(2) In dialing information the first number to be dialed will be the number of the bank. There are four banks in this particular model, however any number of banks could be used. The four banks used in this model are: one (1) information, two (2) bearing, three (3) range, four (4) altitude. It will be noted that in this model three of the banks have three numbers or rows (banks 2, 3, and 4); however any number of annunciators may be used as in the case of bank number one (bottom bank) which has a prefix annunciator with ten prefixes, (such as speed, code, turn left, etc.) and three number annunciators.

(3) As stated above when dialing information, the first number to be dialed will be the number of the bank. Initial movement of the dial will again cause S–502 on the dial to close causing 28 volts to be applied to K–508 which when energized will cause 28 volts to be applied to the stepping solenoid of the station selector stepping switch K–502A and since it was left on position number two by the action of S–502 and K–508 through the process of dialing the station selection it will now be stepped to position three (3). In addition, the action of K–508 will cause 28 volts to be applied through the sliding contacts and terminal 3 of K–502B, the normally closed contacts of K–503, K–509, and K–513 to the reset solenoids of the bank, prefix, row 1, row 2, and row 3 annunciators causing them to relax to the blank position. In addition 28 volts will be applied from terminal 3 of K–502B to K–512 causing it to energize and apply 28 volts to the stepping solenoid of the row stepping switch causing it to step to position one. Relaxation of the dial will cause 28 volt pulses corresponding to the number dialed to be applied from S–501 to K–507. Pulsing of K–507 will cause 28 volt pulses to be applied through the sliding contacts and terminal number 3 of K–502 and through sliding contacts and terminal number one of the row stepping switch K–506 to the stepping solenoid of the bank stepping switch K–505 causing it to move to the position corresponding to the number dialed, and to the bank annunciator in the data transmitter unit causing it to indicate the number of the bank the information is being sent to. First movement of the bank stepping switch K–505 will cause the "bank off" normal switch S–504 to close thus energizing K–503. This action will prevent the subsequent initial movements of the dial from energizing the reset solenoids of the annunciators until the particular bank of information is sent and the next bank is started. Subsequent action of the dial will cause the row stepping switch K–506 to move one position with each initial movement of the dial and cause the output of the dial pulser S–501 to be fed to each succeeding row through the sliding arm and contacts of K–506A, K–505, and K–506B for banks 2, 3, and 4 and K–506 for bank 1, causing the annunciators to step to the number corresponding to the number dialed.

(4) It will be noted that the pulses fed to the row 3 annunciator are also fed to K–510. The first pulse fed to K–510 caused 28 volts to be fed to K–511 causing it to be energized and apply 28 volts holding voltage to its solenoid through one set of its contacts and the row "off normal" switch S–508 which was closed by initial movement of the row stepping switch K–506. Upon completion of the last pulse of the last number of the particular bank, S–502 on the dial will open causing K–512 to be de-energized through the action of K–508. When K–512 is de-energized 28 volts will be fed through its normally closed contacts through the energized contacts of K–511 to the reset solenoids of the row stepping switch K–506 and the bank stepping switch K–505 causing them to relax to the normal position.

(5) Movement of K–506 to the normal position will cause S–508 to open and thus remove the voltage from K–511 allowing it to open and remove the reset voltage from K–506 and K–505. Resetting of K–505 causes S–504 to open allowing its contacts to close so that initial movement of the dial, when dialing the next bank to which information is to be sent, will cause all of the annunciators to be returned to the blank position through the action as set forth in paragraph 3 of this section.

(6) In addition to the action described above it will be noted that only the dial pulses are sent from the data transmitter unit to the translator unit through pins A and B of connector J–2. The pulses which are fed through the pin A of connector J–2 will cause the same action as described in paragraphs 4, 5, 6 and 7 of B of this section with the exception that the closing of relay K–2 now causes 28 volts to be applied to the stepping solenoid of the two row stepping switches and causes them to step to the number one position.

(7) In addition to the above, the pulses caused by the relaxation of the dial will cause the same action as set forth in paragraph B8 of this section, with the exception that pulsing of K–1 causes 28 volts to be fed through the now closed contacts of K–15, through the sliding contact and position one of the row 5 stepping switch to the stepping solenoid of the bank stepping switch causing it to step in accordance with the number dialed.

(8) At the end of this first series of pulses the integrator circuit will allow the integrator relay K–2 to become de-energizd until the start of the next series of pulses. When K–2 de-energizes it causes 28 volts to be applied through one of its sets of contacts, through the sliding contact and contact number one of the row 6 stepping switch, through the sliding contacts and the contacts selected by the previous number dialed on the bank 1 stepping switch, through the sliding contacts and contact number one of the row selected, through pin R of J–5, to the reset solenoids of the annunciators in the bank selected causing them to relax to the blank position and thus made ready to receive new information. The ground return circuit for this operation is supplied through the appropriate pin of J–5 and the corresponding contacts and sliding contact of the bank 2 stepping switch.

(9) Dialing of the next number (the first number of the information to be sent) will cause the same action to take place causing the row 6 and row 3 stepping solenoids to be energized and step to the next position (position 2). This will cause the pulses of the second number to be fed through the sliding contact and contact two of the row 5 stepping switch to the sliding contact of the bank one switch and from there through the set of contacts selected by the previous number dialed to the sliding contacts of either the row 1, 2, 3 or 4 stepping switch and through the number 2 contacts of that switch to the first annunciator of that row. The ground circuit for the annunciator is completed through one set of contacts and the sliding contacts of the bank 2 stepping switch. This action will be repeated for each row until the last number is sent.

(10) Upon completion of the last number dialed in each row (the third in the case of the 2nd, 3rd, or 4th row and the fourth in the case of the 1st row) the row 6 switch will be left in the 4th or 5th position and the bank 3 stepping switch will be in one of the first 4 positions depending on the bank selected. When sufficient time has elapsed to allow the integrator circuit to become de-energized (about 0.2 second) K–2 will de-energize causing 28 volts to be applied through one set of its contacts, through the sliding contact and contacts 4 or 5 of the row 6 stepping switch, through one of the contacts (depending on the bank previously selected) and the sliding contacts of the bank 3 stepping switch to the cathode of one half of V–407 in the number 2 information reset circuit. This positive pulse on the cathode of V–407 is coupled directly to the grid of one-half of V–403 causing it to conduct thus energizing its plate relay K–4. Energizing of K–4 applies 28 volts to the reset solenoids of the bank and row stepping switches and causes them to relax to the blank position thus making them ready for another sqeuence of events on another bank.

D. *The repeat back circuits*

(1) The only functions which are repeated back are the stepping of the bank stepping switch, the stepping of the annunciators, and information reset. The first two are accomplished by pulses from K–14 (in the case of the bank stepping switch) and the pulses from the contacts on the annunciator being fed through pin Y of connector J–5 (in the case of the annunciators).

(2) These 28 volt pulses are fed through the energized contacts of K–12, through the energized contacts of K–2, through the normally closed contacts of K–10, and from here cause the same action as set forth in paragraph D–5 of this section, after the pulses were fed through K–10. It should be noted here that these pulses will not cause the dial modulator to be modulated nor cause the transmitter to be keyed as the pulses necessary to accomplish this must go through contacts on K–12 which are now open.

(3) The only function of the pulses described above is to feed 28 volts from one set of contacts of K–2, through one set of contacts of the space relay K–5, to the add side of the add-subtract relay. This will cause the add relay to move up one position each time the space relay K–5 closes so that the number of notches it moves around will correspond with the number that the particular annunciator has stepped to.

(4) Upon the completion of each sequence of pulses (each number sent) after a short time interval (as explained in paragraph B7 of this section) the integrator relay K–2 will de-energize causing the output of the pulsing contact of the add-subtract relay K–20 to be applied through one set of its contacts to the normally closed contacts of K–10. From here the action will be the same as that described in paragraphs B4 and B5 of this section, after the pulses were fed through K–10 and as described also in paragraph B6 of this section, with the addition that during the time that the pulse relay K–6 is energized and the space relay K–5 is de-energized, 28 volt pulses will be fed from one set of contacts on K–6, through normally closed contacts of K–5, through normally closed contacts of K–12 to the subtract solenoid of the add-subtract relay causing it to step down one position. The above sequence will continue until the ratchet wheel on the add-subtract relay has stepped back to its neutral position, wherein the sequence will stop.

(5) Information reset is repeated back by applying a 28 volt signal from one set of contacts on the number 1 information reset relay K–3, through normally closed contacts of K–10, through pin 5 of J–9 to the keying relay K–303 of the tone channel and through another set of contacts on the relay K–3, through normally closed contacts of relay K–19 to the solenoid of relay K–18. Closing of relay K–18 causes the transmitter RF carrier to be keyed as set forth in paragraph A–1 of this section.

(6) As a precaution against dialing during the time a station is repeating back, a spring loaded brake is affixed to the dial. This brake is released by 28 volts supplied when K–2 the integrator relay is de-energized which occurs when the last pulse is received.

E. *Execute-acknowledge*

(1) When the information has been sent and it is ready to be executed a signal for this purpose may be transmitted which will light an indicator light on the receiving stations panels. This is accomplished as set forth below:

(2) Pressing of S–506 the execute button in the data control unit will cause 28 volts to be applied through pin D of J–2 which will be applied to the solenoid of the transmitter keying relay K–18 and through the action described in paragraph A–1 of this section, cause the transmitter to be keyed.

(3) In addition pressing of S–506 causes a ground to be applied through pin F of J–2, through the energized contacts of K–10, through pin 7 of J–9 to the channel keying relay K–304 of the execute-acknowledge channel, causing the tone to be applied to the already keyed radio frequency carrier.

(4) Reception of this tone will occur in the receiving station.

F. *Resetting of complete panel*

(1) In normal operation information will probably be sent or changed on only one or two banks at a time, such as altitude or bearing changes only. However should it be necessary to completely reset the whole panel at one time such as in the case of an aircraft or mobile station leaving the area it may be done by proceeding as follows:

(2) Dial zero on the telephone dial. Relaxation of the dial will now cause a repeat of the action as set forth in paragraphs B–4, B–5, and B–6 of this section.

(3) Reception of these pulses at the selected station causes the same action as outlined in paragraph B–7 herein with the exception that the closing of K–2 causes 28 volts to be applied to the stepping solenoid of the row selector stepping switches through the now closed contacts of K–15 (K–15 became energized when station was selected) causing them to advance to the first position.

(4) In addition, the reception of these pulses at the selected station causes the same action as outlined in paragraph B–8 herein with the exception that the pulsing of K–1 causes 28 volts to be fed through the now closed contacts of K–15, the sliding arm and contact number 1 of the row 5 stepping switch to the stepping solenoid to the bank stepping switch causes it to step to position 10 in accordance with the ten pulses of the dial.

(5) When position 10 is reached by the bank stepping switch a ground is supplied, through the sliding arm and contact 10 of the bank 2 segment of this switch to K–13 causing it to energize. Closing of this relay K–13 causes a ground return to be placed on all the impulse counting annunciators in the indicator unit making them ready for the reception of the information reset signal.

(6) Pressing of the information reset switch S–507 in the data transmitter control causes 28 volts to be applied to K–515. Energizing of K–515 applies 28 volts to pin D of connector J–2 and the action is the same as described in paragraph A–1 herein.

(7) In addition to paragraph F–6 herein pressing of S–507 applies a ground through pin E of connector P–2, through the closed contacts of K–10, to relay K–303 in the modulator unit. Closing of the contacts of this relay completes the cathode circuit of the information reset oscillator and applies this tone to the already keyed RF carrier.

(8) Reception of the reset tone in the selected station causes K–203 to be energized in the selector unit. Closing of the contacts of K–203 causes 28 volts to be applied, through the normally closed contacts of K–204, through the now closed contacts of K–203, to the grid of one half of V–406. This positive pulse on the grid of V–406 causes the coupling capacitor to discharge through the clamping tube V–408. At the end of the positive signal on the grid of V–406 the plate would again go positive causing the coupling capacitor to charge through the grid resistor of V–404. The positive signal on the grid of V–404 causes this tube to draw plate current through its plate relay K–3. Closing of this relay causes 28 volts to be applied through pin R of connector J–5 to the reset solenoids of all of the impulse counting annunciators causing them to reset to the blank position. In addition to the above closing of one set of contacts of K–3 causes 28 volts to be applied to the grid of the one-half of V–405 (the number 2 information reset circuit) and through the action described above, causes plate current to flow in one-half of V–403, through its plate relay K–4. Closing of the contacts of K–4 applies 28 volts to the reset solenoids of the row and bank stepping switches causing them to reset to the blank position.

In the description and drawings herein certain standard numbers have been repeated as, for example, pin numbers on tubes and terminal letters on terminal boards so as to conform with tube manuals and standard lettering of manufactured terminals in such commercial items. This has been done in the interest of avoiding confusion in the numbering scheme which otherwise such departure from convention in the art might engender.

As has been shown the present invention provides a visual display type radio signalling system to transmit, receive and visibly display digital information or data; which is usable with standard radio transmitters and receivers or transceivers; wherein a master or control station may transmit information such as position and combat instructions of range, bearing, altitude course and speed, etc. to any one or a plurality of selected stations of a relatively large group of slave stations; the equipment being usable either in a simplex or a duplex communications link; readily adaptable to line-of-sight operation; usable simultaneously with code and voice communications on optimum frequencies; containing features of automatic volumes and level control, repeatback, minimum number of modulation channels, automatic reset, circuit isolation; and which will be economical, of light weight suitable for airborne use and compact in size; and which provides a packaged data transmission-display unit.

While the invention is in nowise to be construed as limited by these suggestions of utility, the characteristics of the data transmission-display group are such that it can be utilized in applications such as the following:

*ASW, AEW, and CIC operations.*—In anti-submarine and early warning operations, the data transmission-display system is recommended to carry or transmit all routine messages from the controlling radar plane to its interceptor and killer-type planes. The data system may also be used to transmit some messages not considered routine, because the system is provided with an information row which might be used to carry many different directions.

*Control of patrol planes.*—Many of the routine messages and some of the nonroutine messages normally transmitted from a ground or shipboard control station to a patrol aircraft may be handled by the data transmission system. In the same type of operations, the patrol plane may be equipped with a data transmission-display control system to be used for transmitting information concerning either enemy or friendly targets to cognizant authority using the coding of the system to hide the identity of the information.

*Re-relay of information to distant points.*—When using the data transmission-display system on duplex operation, re-relay of information may be obtained over great distances. However, some modification would be necessary because with presently available equipment, only the first receiving station in the re-relay link would send a signal check for accuracy to the control station.

*Master station control of an assigned area.*—The transmission of information from a signal control station to many stations in an assigned area may be accomplished by using the "00" station call. An example of this would be a place where four or five stations were interested in the flight of a drone type aircraft. The drone controller might with the aid of a data transmission-display control system send simultaneously to all interested stations information concerning the flight of the aircraft.

The equipment might be modified within the teachings of the invention to use of an all electronic system to increase the speed of data transmission. While a system using digital information transmission with all electronic circuits might be prohibitive in size if standard size tubes or miniature tubes were to be used, a practical system using sub-miniature tubes or transistors can be devised. Use might also be made of a rotating-beam or commutator tube for storing and routing the information. Since this tube has many tubes in one envelope, the space and weight saved would be an important consideration.

The indicator panel, as described hereinbefore in the "Indicator Panel" section, is considered most desirable both in size and information displayed. However, in consideration of the size of the mounting panel space available in some of the new fleet operating fighter type aircraft, an indicator panel with a single row of four message registers might be more desirable. This would reduce the size of the indicator panel to approximately one-third of its present size. This reduction of the indicator panel would necessitate changing the information displayed at the receiving station each time information is transmitted, thus deleting the present retention of information.

The present data transmission-display group uses a visual means of showing information being received. Since under many conditions the pilot or receiver is performing other tasks when information is being received, an aural indication might be recommended in addition to or in place of the present system.

The following parts list shows component values and related information concerning a satisfactorily operating aparatus of the illustrative embodiment of the inventive apparatus. However, it should be understood that this table is cited merely by way of example and is in no sense to be construed as limiting the scope of the invention.

RECEIVER AMPLIFIER.—PART OF DATA TRANSMISSION DISPLAY TERMINAL UNIT

| Part No. | Description | Function |
|---|---|---|
| C-101 | Capacitor—250 µµf., mica, tolerance ±10% 400 wv. | Input coupling to V101-A. |
| C-102 | Capacitor—0.1 µf., 600 wv., one of 3×0.1 µf., can mount. | Plate bypass of V101-A. |
| C-103 | Capacitor—200 µµf., mica, silver, 400 wv., tolerance ±5%. | Input coupling capacitor to high pass filter. |
| C-104 | do | Part of high pass filter. |
| C-105 | Capacitor—250 µµf., mica silver, 400 wv., tolerance, ±5%. | Do. |
| C-106 | Capacitor—0.1 µf., 600 wv., one of 3×0.1 µf., can mount. | Plate supply filter for V101-B. |
| C-107 | Capacitor—510 µµf., mica, 400 wv., tolerance ±10%. | Coupling capacitor from V101-B to V102-A. |
| C-108 | Capacitor—0.1 µf., 600 wv. one of 3×0.1 µf., can mount. | Filter for regulated voltage of NE-32. |
| CR-101 | Crystal-diode 1N39 | Used as a clipping diode to maintain a regulated signal output. |
| CR-102 | do | Do. |
| R-101 | Resistor—100,000 ohms, ±20%, ½ watt, carbon. | Grid return resistor. |
| R-102 | Resistor—1,500 ohms, ±20%, ½ watt, carbon. | Cathode bias. |
| R-103 | Resistor—2,700 ohms, ±20%, ½ watt, carbon. | Cathode load. |
| R-104 | Resistor—27,000 ohms, ±20%, ½ watt, carbon. | Plate supply dropping resistor. |
| R-105 | Resistor—56,000 ohms, ±5%, ½ watt, carbon. | Part of high pass filter. |
| R-106 | Resistor — 110,000 ohms, ±5%, ½ watt, carbon. | Do. |
| R-107 | Resistor—500 ohms, ±20%, ½ watt, carbon. | Cathode bias. |
| R-108 | Resistor — 10,000 ohms, ±20%, ½ watt, carbon. | Plate supply dropping resistor. |
| R-109 | do | Grid limiting. |
| R-110 | Resistor — 270,000 ohms, ±20%, ½ watt, carbon. | Grid return resistor. |
| R-111 | Resistor—910 ohms, ±10%, ½ watt, carbon. | Part of signal voltage divider. |
| R-112 | do | Do. |
| R-113 | Resistor—100 ohms, ±10%, ½ watt, carbon. | Cathode bias. |
| R-114 | Resistor — 150,000 ohms, ±10%, 1 watt, carbon. | Bleeder. |
| R-115 | Resistor — 75,000 ohms, ±10%, ½ watt, carbon. | Plate load resistor. |
| R-116 | Resistor — 35,000 ohms, ±20%, ½ watt, carbon. | Part of voltage divider. |
| R-117 | Resistor — 65,000 ohms, ±20%, ½ watt, carbon. | Do. |
| L-101 | Reactor — fixed, universal winding on powdered iron core, inductance 100 millihenries, ±5%, impregnated with high quality wax. | Part of high pass filter. |
| L-102 | do | Do. |
| V-101(A), V-101(B) | Tube—electron, 12AT7, duo-triode, 9 pin noval. | Cathode follower and first voltage amplifier. |
| V-102 | Tube—12AT7, duo-triode, 9 pin noval socket. | Push-pull output stage. |
| VR-101 | Tube-NE-32, neon, 1 watt, bayonet base. | Voltage regulator for clipping circuit. |
| T-101 | Transformer—audio, center tapped primary, 20,000 ohms, secondary, 10 ohms (Thordarson T46215). | Output transformer. |
| P-101 | Plug—15-pin-amphenol, self-aligning, male. | Connector. |

SELECTOR.—PART OF DATA TRANSMISSION-DISPLAY TERMINAL UNIT

| Part No. | Description | Function |
|---|---|---|
| C-201 | Capacitor—1370 µµf., 2%, 400 wv., silver mica, fixed. | Part of channel No. 1 series resonant circuit. |
| C-202 | Capacitor—10 to 100 µµf., variable, ceramic. | Tuning capacitor for channel No. 1, 21 kc. |
| C-203 | do | Tuning capacitor for channel No. 2, 25 kc. |
| C-204 | Capacitor—948 µµf., ±2%, 400 wv., silver mica, fixed. | Part of channel No. 2 series resonant circuit. |
| C-205 | Capacitor—0.01 µf., 400 wv., mica, ±10%. | Bypass capacitor used to filter signal impressed across coil of plate relay. |
| C-206 | do | Do. |
| C-207 | do | Do. |
| C-208 | do | Do. |
| C-209 | Capacitor—10 to 100 µµf., variable, ceramic. | Tuning capacitor for channel No. 3, 29 kc. |
| C-210 | Capacitor—680 µµf., ±2%, 400 wv., silver mica, fixed. | Part of channel No. 3 series resonant circuit. |
| C-211 | Capacitor—10 to 100 µµf., variable, ceramic. | Tuning capacitor for channel No. 4, 33 kc. |
| C-212 | Capacitor—500 µµf., ±2%, 400 wv., silver mica, fixed. | Part of channel No. 4 series resonant circuit. |
| K-201 | Relay—four pole, double throw, 20,000 ohm coil, plate current relay, Clare type "J." | Plate load for V201-A, used to generate control pulses. |
| K-202 | do | Plate load for V-201-B, used to generate control pulses. |
| K-203 | do | Plate load for V202-A, used to generate control pulses. |
| K-204 | do | Plate load for V202-B, used to generate control pulses. |
| L-201 | Inductance—42 millihenries, Universal wound coil powdered iron core, ±5%, fixed. | Part of series resonant circuit channel No. 1, 21 kc. |
| L-202 | do | Part of series resonant circuit channel No. 2, 25 kc. |
| L-203 | do | Part of series resonant circuit channel No. 3, 29 kc. |
| L-204 | do | Part of series resonant circuit channel No. 4, 33 kc. |
| V-201 | Tube—6BQ7, duo-triode, 9 pin, noval base. | Channels No. 1 and No. 2 control tubes. |
| V-202 | do | Channels No. 3 and No. 4 control tubes. |
| R-201 | Resistor—110,000 ohms, ½ watt, ±5% carbon, fixed. | Decoupling resistor for channel No. 1 resonant circuit. |
| R-202 | Resistor—1.1 megohms, ½ watt, ±5%, carbon, fixed. | Grid leak resistor for V201-A. |
| R-203 | Resistor—110,000 ohms, ½ watt, ±5%, carbon, fixed. | Decoupling resistor for channel No. 2 resonant circuit. |
| R-204 | Resistor—1.1 megohms, ½ watt, ±5%, carbon, fixed. | Grid leak resistor for V201-B. |
| R-205 | Resistor—510 ohms, ±2%, 2 watt, carbon, fixed. | Filament dropping resistor. |
| R-206 | do | Do. |
| R-207 | Resistor—1.1 megohms, ±5% ½ watt, carbon, fixed. | Grid leak resistor for V202-B. |
| R-208 | Resistor—110,000 ohms, ±5%, ½ watt, carbon, fixed. | Decoupling resistor for channel No. 4 resonant circuit. |
| R-209 | Resistor—1.1 megohms, ±5%, ½ watt, carbon, fixed. | Grid leak resistor for V202-A. |
| R-210 | Resistor—110,000 ohms, ±5%, ½ watt, carbon, fixed. | Decoupling resistor for channel No. 3 resonant circuit. |
| P-201 | Plug—15 pin, Amphenol, self-aligning, male plug. | Connector (plug-in). |

MODULATOR.—PART OF DATA TRANSMISSION-DISPLAY TERMINAL UNIT

| Part No. | Description | Function |
|---|---|---|
| C-301 | Capacitor—10 to 100 μμf., variable, ceramic. | Tuning capacitor for channel No. 1 modulator. |
| C-302 | Capacitor—82 μμf, ±2%, 400 wv., silver mica, fixed. | Part of capacitive voltage divider coupling the output of channel No. 1 modulator. |
| C-303 | Capacitor—1,388 μμf., ±2%, 400 wv., silver mica, fixed. | Part of channel No. 1 modulator resonant circuit. |
| C-304 | Capacitor—1,000 μμf., ±5%, 400 wv., silver mica, fixed. | Coupling capacitor from resonant tank to the grid of V301-A in channel No. 1 modulator. |
| C-305 | Capacitor—10 to 100 μμf., variable, ceramic. | Tuning capacitor for channel No. 2 modulator. |
| C-306 | Capacitor—82 μμf., ±2%, 400 wv., silver mica, fixed. | Part of capacitive voltage divider coupling the output of channel No. 2 modulator. |
| C-307 | Capacitor—1 000 μμf., ±5%, 400 wv., silver mica, fixed. | Coupling capacitor from resonant tank to the grid of V302-A in channel No. 2 modulator. |
| C-308 | Capacitor—962 μμf., ±2%, 400 wv., silver mica, fixed. | Part of channel No. 2 modulator resonant circuit. |
| C-309 | Capacitor—10 to 100 μμf, variable, ceramic. | Tuning capacitor for channel No. 3 modulator. |
| C-310 | Capacitor—82 μμf., ±2%, 400 wv., silver mica, fixed. | Part of capacitive voltage divider coupling the output of channel No. 3 modulator. |
| C-311 | Capacitor—1,000 μμf., ±5%, 400 wv., silver mica, fixed. | Coupling capacitor from resonant tank to the grid of V301-B in channel No. 3 modulator. |
| C-312 | Capacitor—650 μμf., ±2%, 400 wv., silver mica, fixed. | Part of channel No. 3 modulator resonant circuit. |
| C-313 | Capacitor—10 to 100 μμf., variable, ceramic. | Tuning capacitor for channel No. 4 modulator. |
| C-314 | Capacitor—82 μμf., ±2%, 400 wv., silver mica, fixed. | Part of capacitive voltage divider coupling the output of channel No. 4 modulator. |
| C-315 | Capacitor—1,000 μμf., ±5%, 400 wv., silver mica, fixed. | Coupling capacitor from resonant tank to the grid of V302-B in channel No. 4 modulator. |
| C-316 | Capacitor—470 μμf., ±2%, 400 wv., silver mica, fixed. | Part of channel No. 4 modulator resonant circuit. |
| C-317 | Capacitor—0.1 μf., 400 wv., one of 3 × 0.1 capacitors. | B+ supply voltage bypass or filter. |
| C-318 | Capacitor—500 μμf., ±10%, 400 wv., mica, fixed. | Coupling capacitor. |
| C-319 | Capacitor—240 μμf., ±10%, 400 wv., mica, fixed. | Coupling capacitor from capacitive divider to grid of V303-A. |
| C-320 | Capacitor—5,100 μμf., ±10% 400 wv., fixed. | Part of capacitive voltage divider. |
| C-321 | Capacitor—0.01 μf., ±10%, 400 wv., mica, fixed. | Output coupling capacitor. |
| C-322 | do | Do. |
| C-323 | do | Cathode bypass capacitor of V303-B. |
| C-324 | Capacitor—0.1 μf., 400 wv., one of 3×0.1 capacitors. | B+ supply voltage bypass or filter. |
| K-301 | Relay—double pole, double throw, 28 v. D.-C. | Channel No. 1 modulator keying relay. |
| K-302 | do | Channel No. 2 modulator keying relay. |
| K-303 | do | Channel No. 3 modulator keying relay. |
| K-304 | do | Channel No. 4 modulator keying relay. |
| K-305 | do | Channels No. 3 and No. 4 modulators keying relay (combination). |
| L-301 | Inductance—40 millihenries, Universal wound coil on a powdered iron core. | Part of channel No. 1 resonant circuit. |
| L-302 | do | Part of channel No. 2 resonant circuit. |
| L-303 | do | Part of channel No. 3 resonant circuit. |
| L-304 | do | Part of channel No. 4 resonant circuit. |
| P-301 | Plug—15 pin, Amphenol, self-aligning, male plug. | Connector (plug-in). |
| V-301 | Tube—12AU7, duo-triode, 9 pin, noval base. | Channels No. 1 and No. 3 supersonic oscillators. |
| V-302 | do | Channels No. 2 and No. 4 supersonic oscillators. |
| V-303 | do | Voltage amplifier and cathode phase splitting output. |
| V-304 | Tube—OB2, voltage regulator gaseous tube. | Regulates plate voltage for the oscillators. |
| R-301 | Resistor—100,000 ohms, carbon, fixed, 5%. | Grid leak resistor for channel No. 1 oscillator. |
| R-302 | do | Grid leak resistor for channel No. 2 oscillator. |
| R-303 | do | Grid leak resistor for channel No. 3 oscillator. |
| R-304 | do | Grid leak resistor for channel No. 4 oscillator. |
| R-305 | Resistor—4,700 ohms, carbon, fixed, 5%. | Plate supply decoupling resistor. |
| R-306 | Resistor—68,000 ohms, carbon, fixed, 5%. | Plate load resistor. |
| R-307 | Resistor—2,400 ohms, carbon, fixed, 5%. | Do. |
| R-308 | Resistor—270,000 ohms, carbon, fixed, 5%, ½ watt. | Grid leak resistor. |
| R-309 | Resistor—1,000 ohms, carbon, fixed, 5%, ½ watt. | Cathode bias resistor. |
| R-310 | Resistor—270,000 ohms, carbon, fixed, 5%, ½ watt. | Grid leak resistor. |
| R-311 | Resistor—200 ohms, carbon, fixed, 5%, ½ watt. | Cathode bias resistor. |
| R-312 | Resistor—2,400 ohms, carbon, fixed, 5%, ½ watt. | Cathode load resistor. |
| R-313 | Resistor—15,000 ohms, carbon, fixed, 5%, 4 watts. | Plate supply decoupling resistor for voltage regulator. |

PULSE AMPLIFIERS.—PART OF DATA TRANSMISSION-DISPLAY TERMINAL UNIT

| Part No. | Description | Function |
|---|---|---|
| C-401 | Condenser—0.005 μf., mica, 10%, fixed. | Part of differentiator circuit in information pulse amplifier. |
| C-402 | Condenser—0.001 μf., mica, 20%, fixed, 400 wv. | Noise bypass in grid circuit of information pulse amplifier. |
| C-403 | Condenser—0.1 μf, sealed tubular, 10%, fixed, 400 wv. | Coupling between V405 and V403. |
| C-404 | Condenser—0.22 μf., sealed tubular, 10%, fixed, 100 wv. | Part of time constant in grid circuit of V401-A. |
| C-405 | do | Part of time constant in grid circuit of V401-B. |
| C-406 | Condenser—0.22 μf., sealed tubular, 10%, fixed, 400 wv. | Coupling between V405-B and V403-B. |
| C-407 | Condenser—0.001 μf., mica, 20%, fixed, 400 wv. | Noise bypass in grid circuit of No. 2 information reset amplifier. |
| C-408 | do | Do. |
| C-409 | Condenser—0.22 μf., sealed tubular, 10%, fixed, 400 wv. | Coupling between V406-A and V404-A. |
| C-410 | do | Part of time constant in the grid of V402-A. |
| C-411 | Condenser—0.22 μf, sealed tubular, 10%, fixed, 100 wv. | Part of time constant in the grid of V402-B. |
| C-412 | Condenser—0.22 μf., sealed tubular, 10%, fixed, 400 wv. | Coupling between V406-B and V404-B. |
| C-413 | Condenser—0.001 μf., mica, 20%, fixed, 400 wv. | Noise bypass in grid circuit of execute amplifier. |
| R-401 | Resistor—4,300 ohms, 1 watt carbon, fixed, 5%. | Part of grid circuit noise filter. |
| R-402 | Resistor—1 megohm, ½ watt carbon, fixed, 5%. | Part of differentiator in grid circuit of V405-A. |
| R-403 | Resistor—75,000 ohms, 5%, ½ watt, carbon, fixed. | Isolation for direct coupling to the grid of V405-A. |
| R-404 | Resistor—120,000 ohms, 5%, carbon, ½ watt, fixed. | Plate load resistor for V404-A. |
| R-405 | Resistor—560,000 ohms, 5%, carbon, ½ watt, fixed. | Grid limiting resistor for V403-A. |
| R-406 | Resistor—330,000 ohms, 5%, carbon, ½ watt, fixed. | Grid return resistor for V403-A. |
| R-407 | Resistor—2,200 ohms, 5%, carbon, fixed, ½ watt. | Plate return to ground for V409-A. |
| R-408 | Resistor—360,000 ohms, 5%, carbon, fixed, ½ watt. | Part of time constant in grid circuit of V401-A. |
| R-409 | Resistor—2,000 ohms, 5%, carbon, fixed, ½ watt. | Part of bleeder resistor supplying fixed bias to V401-A. |
| R-410 | Resistor—4,300 ohms, 5%, carbon, fixed, 1 watt. | Part of bleeder resistor supplying fixed and self bias to V401-A. |
| R-411 | do | Part of bleeder resistor supplying fixed and self bias to V401-B. |
| R-412 | Resistor—2,000 ohms, 5%, carbon, fixed, ½ watt. | Part of bleeder resistor supplying fixed bias to V401-B. |
| R-413 | Resistor—430,000 ohms, 5%, carbon, fixed, ½ watt. | Part of time constant in grid circuit of V401-B. |
| R-414 | Resistor—2,200 ohms, 5%, carbon, fixed, ½ watt. | Plate return to ground for V409-B. |
| R-415 | Resistor—560,000 ohms, 5%, carbon, ½ watt, fixed. | Grid limiting resistor for V403-B. |
| R-416 | do | Grid return resistor for V403-B. |
| R-417 | Resistor—120,000 ohms, 5%, carbon, ½ watt, fixed. | Plate load resistor for V405-B. |
| R-418 | Resistor—2,200 ohms, 5%, carbon, fixed, ½ watt. | Grid return for V405-B. |
| R-419 | Resistor—120,000 ohms, 5%, carbon, ½ watt, fixed. | Plate load resistor for V406-A. |
| R-420 | Resistor—2,200 ohms, 5%, carbon, fixed, ½ watt. | Grid return for V406-A. |

| Part No. | Description | Function |
|---|---|---|
| R-421 | Resistor—510,000 ohms, 5%, carbon, fixed, ½ watt. | Grid return for V404-A. |
| R-422 | Resistor—560,000 ohms, 5%, carbon, ½ watt, fixed. | Grid limiting resistor for V404-A. |
| R-423 | Resistor—2,200 ohms, 5%, carbon, fixed, ½ watt. | Plate return to ground for V410-A. |
| R-424 | Resistor—390,000 ohms, 5%, carbon, fixed, ½ watt. | Part of time constant in grid circuit of V402-A. |
| R-425 | Resistor—2,000 ohms, 5%, carbon, fixed, ½ watt. | Part of bleeder resistor supply fixed bias to V402-A. |
| R-426 | Resistor—4,300 ohms, 5%, carbon, fixed, 1 watt. | Part of bleeder resistor supplying fixed and self bias to V402-A. |
| R-427 | Resistor—120,000 ohms, 5%, carbon, ½ watt, fixed. | Plate load resistor for V406-B. |
| R-428 | Resistor—2,200 ohms, 5%, carbon, fixed, ½ watt. | Grid return for V406-B. |
| R-429 | Resistor—560,000 ohms, 5%, carbon, ½ watt, fixed. | Grid limiting resistor for V404-B. |
| R-430 | Resistor—2.2 megohms, 5%, carbon, fixed, ½ watt. | Grid return for V404-B. |
| R-431 | Resistor—2,200 ohms, 5%, carbon, fixed, ½ watt. | Plate return to ground for V410-B |
| R-432 | Resistor—3.3 megohms, 5%, carbon, fixed, ½ watt. | Part of time constant in grid circuit of V402-B. |
| R-433 | Resistor—2,000 ohms, 5%, carbon, fixed, ½ watt. | Part of bleeder resistor supplying fixed bias to V402-B. |
| R-434 | Resistor—4,300 ohms, 5%, carbon, fixed, 1 watt. | Part of bleeder resistor supplying fixed and self bias to V402-B. |
| V-401 | Tube—12A7, duo-triode, 9-pin, noval base. | Output tube of pulse and space amplifiers. |
| V-402 | do | Output tube of transmitter keying and integrator amplifiers. |
| V-403 | do | Output tube of information pulse amplifier and No. 2 information reset amplifier. |
| V-404 | do | Output tube No. 1 information reset and execute amplifiers. |
| V-405 | do | Pulse forming tube of the information pulse amplifier and No. 2 information reset ampere. |
| V-406 | do | Pulse forming tube of No. 1 information reset ampere and execute amplifier. |
| V-407 | Tube—6AL5, duo-diode, 7 pin, miniature base. | Negative clipper for the information pulse and No. 2 information reset amplifiers. |
| V-408 | do | Negative clipper for the No. 1 information reset and execute amplifiers. |
| V-409 | do | Charging diodes for the pulse and space amplifiers. |
| V-410 | do | Charging diodes for the transmitter keying and integrating amplifiers. |
| P-401 | Plug—20 pin, Amphenol, male. | Connector (plug-in). |

KEYER CONTROL

| Part No. | Description | Function |
|---|---|---|
| M-501 | Message register (described) | Station select-tens indicator. |
| M-502 | Message register | Station select-units indicator. |
| M-503 | do | Row indicator. |
| M-504 | do | Prefix indicator. |
| M-505 | do | First column indicator. |
| M-506 | do | Second column indicator. |
| M-507 | do | Third column indicator. |
| K-501 | Magnetic brake for dial | Magnetic lock used to control the dial pulser. |
| K-502 | Stepping switch—two levels | Used to route information to station selection message registers and K-503 K-512, and K-506. |
| K-503 | 300 ohm, 28-v., type relay single pole single throw. | Performs switching in the automatic reset circuit. |
| K-505 | Stepping switch—one level | Row information routing switch. |
| K-506 | Stepping switch—three level | Column information routing switch. |
| K-507 | 250 ohm, 28-v., three pole single throw relay. | Pulse distribution relay. |
| K-508 | 300 ohm, 28-v., two pole single throw relay. | High capacity switching relay. |
| K-509 | 250 ohm, 28-v., four pole double throw relay. | Station reset distribution relay. |
| K-510 | 300 ohm 28-v., single pole single throw relay. | Energizing relay for the automatic reset circuit. |
| K-511 | 300 ohm, 28-v., double pole single throw relay. | Automatic reset holding relay. |

| Part No. | Description | Function |
|---|---|---|
| K-512 | 300 ohm, 28-v., single pole double throw relay. | Column step energizing relay, and column and row reset energizing relay. |
| K-513 | 250 ohm, 28-v., four pole double throw relay. | Information reset distribution relay. |
| S-501 | Pulser switch, single pole single throw, mounted on dial. | Contacts mounted on dial pulser which originates pulses. |
| S-502 | Contacts, single pole single throw, mounted on dial. | Used to originate a control pulse during dial operation. |
| S-503 | Off-normal switch | Off-normal switch set to open on position 4, mounted on station select stepping switch, K-502. |
| S-504 | do | Controls operation of K-503, mounted on row stepping switch K-505. |
| S-505 | Double pole single throw push-button switch (momentary on). | Station reset control switch. |
| S-506 | do | Execute control switch. |
| S-507 | do | Information reset control switch. |
| S-508 | Off-normal switch | Controls operation of K-511, mounted on column stepping switch K-506. |
| J-502 | 14 pin, external receptacle, AN-3102-20-1S. | External receptacle used to cable unit to the terminal unit. |
| I-501 | 28-v., bayonet base, indicator lamp. | Execute indicator lamp. |
| Dial | Telephone type dial pulser | Dial pulser used to originate pulsed information. |

STATION SELECTOR

| Part No. | Description | Function |
|---|---|---|
| K-601 | Stepping switch—two level | Tens-station select relay. |
| K-602 | do | Units-station select relay. |
| S-601 | Ten position manual rotary switch. | Tens-station selection switch. |
| S-602 | do | Units station selection switch. |
| S-603 | Single pole double throw toggle switch. | "General Call," "On-Off" switch. |
| S-604 | Single pole single throw toggle switch. | Power "On-Off" switch controls power of the visual display data-transmission group. |
| J-604 | 10 pin receptacle AN-3102-18-1P. | External receptacle used to cable unit to terminal unit. |

INDICATOR

| Part No. | Description | Function |
|---|---|---|
| M-701 | Message register (described) | Indicator, prefix information row. |
| M-702 | Message register | Indicator, column 1 information row. |
| M-703 | do | Indicator, column 2 information row. |
| M-704 | do | Indicator, column 3 information row. |
| M-705 | do | Indicator, column 1 bearing row. |
| M-706 | do | Indicator, column 2 bearing row. |
| M-707 | do | Do. |
| M-708 | do | Indicator, column 1 range row. |
| M-709 | do | Indicator, column 2 range row. |
| M-710 | do | Indicator, column 3 range row. |
| M-711 | do | Indicator, column 1 altitude row. |
| M-712 | do | Indicator, column 2 altitude row. |
| M-713 | do | Indicator, column 3 altitude row. |
| I-701 | 28-v. lamp bayonet base | Indicator, station select lamp. |
| I-702 | do | Indicator, information pulse lamp. |
| I-703 | do | Indicator, execute lamp. |
| S-701 | Single pole single throw momentary push-button switch. | Acknowledge control switch. |
| J-705 | 28 pin receptacle, AN-3102-28-12S. | External receptacle used to cable the unit to the terminal unit. |

VOLTAGE MEASUREMENTS

[All voltages positive unless otherwise marked. No connection on J-3 of terminal unit (no signal in).]

Power
Input—28 v.
Dynamotor output 255 v.

RECEIVER

| V101—12AT7 | | V102—12AT7 | |
|---|---|---|---|
| Pin | Voltage | Pin | Voltage |
| 1 | 81 | 1 | 240 |
| 2 | 0 | 2 | 0 |
| 3 | 1 | 3 | 2 |
| 4 | 14 | 4 | 0 |
| 5 | 28 | 5 | 14 |
| 6 | 172 | 6 | 240 |
| 7 | 2.1 | 7 | 0 |
| 8 | 1.1 | 8 | 2 |
| 9 | 21 | 9 | 7 |

Noise Output—52 db below 2v., A.=C., R.M.S.

SELECTOR

| V201—6BQ7 | | V202—6BQ7 | |
|---|---|---|---|
| Pin | Voltage | Pin | Voltage |
| 1 | 255 | 1 | 255 |
| 2 | 0 | 2 | 0 |
| 3 | 21 | 3 | 21 |
| 4 | 21 | 4 | 21 |
| 5 | 14 | 5 | 28 |
| 6 | 255 | 6 | 255 |
| 7 | 0 | 7 | 0 |
| 8 | 21 | 8 | 21 |
| 9 | 21 | 9 | 21 |

SUPERSONIC MODULATOR AND MODULATOR AMPLIFIER

| V301—12AU7 (channels 2 and 4 oscillators) | | V302—12AU7 (channels 1 and 3 oscillators) | |
|---|---|---|---|
| Pin | Voltage | Pin | Voltage |
| 1 | 107 | 1 | 107 |
| 2 | 0 | 2 | 0 |
| 3 | 10 to 25 | 3 | 10 to 25 |
| 4 | 7 | 4 | 7 |
| 5 | 7 | 5 | 7 |
| 6 | 107 | 6 | 107 |
| 7 | 0 | 7 | 0 |
| 8 | 10 to 25 | 8 | 10 to 25 |
| 9 | 0 | 9 | 14 |

| V303—12AT7 (modulation amplifier) | | V304—0B2 (regulator) | |
|---|---|---|---|
| Pin | Voltage | Pin | Voltage |
| 1 | 215 | 1 | 107 |
| 2 | 20 | 2 | 0 |
| 3 | 22 | 3 | 0 |
| 4 | 0 | 4 | 0 |
| 5 | 14 | 5 | 107 |
| 6 | 92 | 6 | 0 |
| 7 | 0 | 7 | 0 |
| 8 | 2 | | |
| 9 | 7 | | |

PULSE AMPLIFIER

| V401—12AT7 | | V402—12AT7 | |
|---|---|---|---|
| Pin | Voltage | Pin | Voltage |
| 1 | 240 | 1 | 240 |
| 2 | 0 | 2 | 0 |
| 3 | 19 | 3 | 19 |
| 4 | 28 | 4 | 14 |
| 5 | 14 | 5 | 0 |
| 6 | 240 | 6 | 240 |
| 7 | 0 | 7 | 0 |
| 8 | 19 | 8 | 19 |
| 9 | 21 | 9 | 7 |

| V403—12AT7 | | 4V04—12AT7 | |
|---|---|---|---|
| Pin | Voltage | Pin | Voltage |
| 1 | 240 | 1 | 240 |
| 2 | 14 | 2 | 12 |
| 3 | 28 | 3 | 28 |
| 4 | 14 | 4 | 28 |
| 5 | 28 | 5 | 14 |
| 6 | 240 | 6 | 240 |
| 7 | 14 | 7 | 14 |
| 8 | 28 | 8 | 28 |
| 9 | 21 | 9 | 21 |

| V405—12AU7 | | V406—12AU7 | |
|---|---|---|---|
| Pin | Voltage | Pin | Voltage |
| 1 | 240 | 1 | 205 |
| 2 | 0 | 2 | 14 |
| 3 | 28 | 3 | 28 |
| 4 | 0 | 4 | 14 |
| 5 | 14 | 5 | 0 |
| 6 | 212 | 6 | 205 |
| 7 | 14 | 7 | 14 |
| 8 | 28 | 8 | 28 |
| 9 | 7 | 9 | 7 |

| V407—6AL5 | | V408—6AL5 | |
|---|---|---|---|
| Pin | Voltage | Pin | Voltage |
| 1 | 14 | 1 | 12 |
| 2 | 0 | 2 | 0 |
| 3 | 21 | 3 | 0 |
| 4 | 28 | 4 | 7 |
| 5 | 14 | 5 | 14 |
| 6 | 0 | 6 | 0 |
| 7 | 0 | 7 | 0 |

| V409—6AL5 | | V410—6AL5 | |
|---|---|---|---|
| Pin | Voltage | Pin | Voltage |
| 1 | 0 | 1 | 0 |
| 2 | 0 | 2 | 0 |
| 3 | 14 | 3 | 7 |
| 4 | 21 | 4 | 14 |
| 5 | 0 | 5 | 0 |
| 6 | 0 | 6 | 0 |
| 7 | 0 | 7 | 0 |

Obviously many modifications and variations of the present invention are possible in the light of the above teachings. It is therefore to be understood that within the scope of the appended claims the invention may be practiced otherwise than as specifically described.

What is claimed is:

1. Visual display radio signalling apparatus comprising a first transmitter to transmit carrier wave energy, a first modulator to modulate said transmitter to impress modulation energy on said carrier wave energy, said modulation energy comprising a plurality of supersonic tunes, a data transmitter to activate said first modulator in accordance with digital intelligence to be transmitted, a first receiver to receive said modulated carrier energy, a first receiver amplifier to amplify output of said first receiver, a first selector to distribute the received energy as signals in accordance with said intelligence, a first pulse amplifier to amplify said tones and said signals, a first indicator, first relay means to actuate said first indicator in response to signals from said first pulse amplifier to visually display said digital information, said first indicator comprising repeatback signal actuating means, a second transmitter to transmit carrier wave energy, a second modulator to modulate said second transmitter to impress modulation energy on said carrier wave energy, said indicator repeatback signal actuating means activating said second modulator to cause the second modulator to generate modulation in accordance with repeatback intelligence, a second receiver to receive said modulated carrier of repeatback intelligence, a second receiver amplifier to amplify output of said second receiver, a second selector following said second receiver to distribute the received repeatback energy as signals in accordance with said repeatback intelligence, a second pulse amplifier to amplify output of said second selector, second relay means, a second indicator, said second relay means actuating said second indicator in response to output of said second pulse amplifier to cause the second indicator to visually display repeatback information.

2. In a visual display radio signalling system comprising a master station and a slave station, said master station apparatus comprising means to transmit modulated carrier signals in accordance with predetermined intelligence and means to present a visual display of repeatback of said intelligence, said slave station comprising means to present a visual display of said transmitted intelligence; an indicator disposed in said slave station, said indicator comprising means to initiate repeatback signals representing said transmitted intelligence, and means responsive to said repeatback signals to retransmit said intelligence to the master from the slave station for visual display of the repeatback of intelligence at the master station, said means to transmit modulated carrier signals comprising a data transmitter to initiate signals in accordance with the predetermined intelligence, a modulator to generate a plurality of frequencies just above the audio spectrum in accordance with said intelligence, a pulse amplifier to amplify and shape pulses of said modulation, a transmitter to generate and transmit a carrier wave in the very high frequency range, and relay means coupling the output of said pulse amplifier to said transmitter to modulate said carrier wave.

3. The apparatus of claim 2, said means to present a display of said transmitted information comprising a first receiver to receive the carrier modulated in accordance with predetermined intelligence, a first receiver amplifier to amplify said modulated carrier, a first channel selector to present said modulation in channels corresponding to modulation frequency, a first pulse amplifier to amplify and shape output of said first selector, and first relay means actuated by output of said pulse amplifier to effect display of said intelligence on said slave station indicator.

4. The apparatus of claim 2 wherein said means to retransmit said intelligence comprises said means to initiate repeatback signals, a modulator to generate modulation in accordance with the intelligence to be retransmitted and a transmitter to transmit modulated carrier signals in accordance with repeatback of said last-named intelligence, and wherein said means to present a display of repeatback of said intelligence comprising a second receiver to receive said repeatback intelligence, a second receiver amplifier to amplify output of said second receiver, a second channel selector to present modulation representing repeatback intelligence in channels corresponding to modulation frequency, a second pulse amplifier to amplify and shape output of said second selector, a second indicator and relay means actuated by output of said pulse amplifier to effect display of said repeatback intelligence on said indicator.

5. In a display signalling system comprising a control station and a said receiving station; receiving station comprising a receiver to receive predetermined intelligence from the control station; a receiver amplifier unit coupled to said receiver and including a high-pass filter to attenuate frequencies below a selected frequency; a selector unit coupled to said receiver amplifier and including a plurality of selector circuits; said receiver amplifier amplifying radio receiver output to a power level sufficient to operate the selector circuits; said selector providing channel output; a pulse amplifier unit coupled to said selector to control operational sequences and speed of the display system; an indicator unit coupled to said pulse amplifier to provide visual display of received intelligence and to initiate repeatback of said intelligence; a transmitter; a modulator coupled to said indicator and to said transmitter, and comprising a common amplifier, frequency generator means to supply four super audible frequencies through the common amplifier to modulate said transmitter, and a corresponding relay to key each of the frequency generators; and a station selector unit to provide power and station code selection.

6. The apparatus of claim 5, said station selector unit comprising a power on-off switching means for turning the system on and off, switching means permitting repeatback of information to the control station, a first and a second multi-position switch to select code for station selection, and a pair of stepping relays which in conjunction with the multi-position switches provide station code selection.

7. The apparatus of claim 5, said indicator comprising a plurality of message registers, said message registers comprising electro-mechanical indicators to display information and contacts for originating repeatback of information to be returned to the control station.

8. The apparatus of claim 5, said selector unit comprising four frequency channel selector circuits, each of said selector circuits comprising a vacuum tube having a plate circuit and a grid circuit, said grid circuit comprising a series resonant circuit, said plate circuit comprising a hgh resistance relay, each of the center frequencies of the channels being substantially unrelated harmonically to the others, said plate circuit relays operating when signals from the receiver amplifier contain sufficient power output at selector channel resonant frequency.

9. The apparatus of claim 5, said pulse amplifier unit comprising pulse delay amplifiers and four pulse lengthening amplifiers to control display operational sequence and speed.

10. In a display signalling system comprising a control station and a plurality of receiving stations; control station apparatus comprising a data-transmission-display group, a transmitting means and receiving means, the data-transmission-display group comprising a station selector unit to provide selection of code number to which the receiving station will respond, an indicator unit to provide display of information corresponding to signals repeated back from the receiving station, a keyer control unit to originate information, said information being transmitted from the control station, said keyer control unit additionally providing local display of transmitted information, a terminal unit comprising a major assembly to coordinate units of the data-transmission-display group, a selector, a receiver amplifier to amplify signal output of the receiving means to a level usable for operating the selector, a modulator to supply a plurality of super audio frequencies to modulate the transmitter, a pulse amplifier unit to form control pulses used in the data-transmission-display group and a dynamotor to supply necessary high voltage for the data-display-transmission group, whereby station selection and display-type information may be transmitted to the receiving station and repeatback information may be received and displayed at the control station, thereby enabling the control station to maintain complete control of the plurality of receiving stations.

11. The apparatus of claim 10, said terminal unit comprising a simplex-duplex switching means for selectively effecting simplex and duplex operation and a blanking switch to selectively provide and delete blanking of the receiver amplifier.

12. The apparatus of claim 10, means to couple said receiver amplifier to the receiver, said receiver amplifier comprising a cathode follower, said coupling means comprising a voltage divider and a coupling capacitor coupled into the cathode follower, a high-pass filter fed from said cathode follower, a voltage amplifier following said high pass filter, coupling means disposed between said high pass filter and said voltage amplifier, a push-pull output stage taking output from said voltage amplifier, transformer-coupling means in the output of said push-pull output stage, said transformer-coupling means having a secondary, a voltage divider across said secondary to provide a signal 180 degrees out of phase with signal input to a first half of the push-pull stage, signal input of said first half being coupled from the voltage amplifier, a clipping circuit to maintain constant output voltage from the output stage, said clipping circuit comprising a first and second crystal, a gaseous discharge device, a resistor disposed between the gaseous discharge device and ground, the anode of the crystals being connected to the gaseous discharge device and resistor junction, the cathode of the first crystal being connected to the plate of the first half of the push-pull stage and the cathode of the second crystal being connected to the plate of the second-half of the push-pull stage, a B plus source, said output transformer having a center tap in its primary, said center tap being connected to said B plus source, said first crystal thereby maintaining constant output stage supply voltage, so that any signals present on the output stage plates larger in magnitude than twice reference voltage will cause the crystals to conduct during negative signal portions, thus limiting plate swing in the negative direction to this predetermined voltage level, the push-pull output stage thereby producing a symmetrically clipped signal output on the secondary of the output transformer, the output transformer being a step-down transformer to provide low impedance output for coupling to the selector.

13. The apparatus of claim 12 including means for providing blanking out of the receiver amplifier, said last named means comprising a terminal unit blanking switch and lead means, a coupling capacitor disposed between the voltage amplifier and the first half of the push-pull stage, said lead means being connected between said push-pull stage and said last named coupling capacitor.

14. The apparatus of claim 10, said selector comprising four series-resonant circuits connected in parallel, each of said series-resonant circuits having a high impedance point, first, second, third and fourth vacuum tube stages, each of said stages comprising a plate and a control grid, first, second, third and fourth decoupling resistors, each of the four series-resonant circuits being electrically connected at its high impedance point to the respective grid of one of said vacuum tube stages by a respective one of said decoupling resistors, the plate circuit of each of said vacuum tube stages comprising a plate-current type relay including a relay coil and a contact, said relay closing on application of a sufficient signal at preselected frequency of a respective one of the four series-resonant circuits, capacitor bypass means to filter A.C. signals impressed across the relay coils, a positive voltage source, closing of each of said relays connecting the voltage source through the contact of the relay, a combination of input signals closing two of the contacts to apply the positive voltage through the two contacts, said selector thereby changing preselected super audio frequencies to predetermined voltage, control pulses.

15. The apparatus of claim 10, said modulator comprising first, second, third and fourth frequency generators, said generators being L-C type oscillators of preselected frequency and being normally in a cut-off state, each of said generators comprising a cathode circuit, a respective relay for each generator, said relay having a coil and a contact, each respective contact completing its respective generator cathode circuit on grounding of the relay to allow the generator to operate at its preselected frequency, means to simultaneously effect operation of said third and fourth generators, a first vacuum tube amplifier stage, capacitive means to couple the generators to the amplifier stage, a phase-splitter to provide a signal balanced to ground following said amplifier stage, a pair of output coupling means to couple the outputs from said phase splitter and voltage regulating means to provide stable operation of the frequency generators, first, second, third and fourth capacitors disposed between respective L-C grid circuits and the coupling means to the generator, a fifth capacitor disposed between said last named coupling means and ground, said first, second, third, and fourth capacitors in conjunction with said fifth capacitor forming a capacitive voltage divider to decouple the frequency generators and provide an equal output from each frequency generator.

16. The apparatus of claim 10, said pulse amplifier unit comprising an information pulse amplifier, a first and a second information reset amplifier, an execute amplifier, a pulse amplifier, a space amplifier, a transmitter keying amplifier and an integrating amplifier, an indicator, said amplifiers comprising relay means in each amplifier and means to effect corresponding respective relay operation to cause proper operation of said indicator.

17. The apparatus of claim 10, said pulse amplifier comprising: an information pulse amplifier comprising first, second and third uniflow device stages, said first stage comprising a plate, a control grid and a cathode, an input coupling capacitor, a positive voltage source with respect to ground, an input coupling capacitor disposed between said positive voltage source and the first stage control grid, means to differentiate signals applied to said first stage control grid, bias means to bias said cathode, means to remove the positive voltage source, thereby applying a negative pulse to the first stage, the first stage not operating with this short pulse because of the cathode bias holding the first stage in cut-off condition, application of the positive voltage source to the control grid of the first stage applying a positive pulse to force conduction of said first stage, thereby providing a negative signal on the first stage plate, said third stage comprising a plate, a control grid and a cathode, coupling means including a capacitor and a grid limiting resistor to couple signals from the first stage plate to the third stage grid, a discharge resistor to discharge the capacitor disposed between the junction of the capacitor and the grid limiting resistor and a positive source, the second stage comprising a cathode disposed at said last named junction point and a grounded plate, the second stage parallelling the discharge resistor, providing very rapid discharge of the coupling capacitor to prevent negative pulses from blocking the third stage grid, return of the first stage to cut-off causing a positive signal at the grid of the third stage causing conduction of said third stage, a third stage plate relay energized on conduction of the third stage for a duration corresponding to the RC time constant of the coupling capacitor and the grid return resistor, means for applying a positive pulse to the first stage amplifier to keep the third stage plate relay in inoperative state, and a keying control to actuate said last named means; a first information reset amplifier comprising a first and a third stage, each having a plate, a cathode and a control grid and a second stage having a plate and a cathode, a first positive voltage source connected to the cathode of said first stage, a second positive voltage source, a first stage grid return resistor disposed between the grid of the first stage and the second voltage source, means to apply a signal from said first voltage source to the first stage grid to cause the first stage to conduct heavily, producing a large negative plate signal, coupling means between said first stage and said third stage comprising a coupling capacitor, a grid return resistor parallelled by said second stage and a grid limiting resistor, thereby effecting a rapid discharge path for negative signals, to unblock the third stage grid, removal of positive signal from the first stage grid causing heavy conduction through the third stage, a third stage plate current relay energized on said heavy conduction, a length of time corresponding to the coupling capacitor and the grid return resistor; a pulse amplifier comprising a first electronic uniflow device stage and a second electronic uniflow stage, said first stage comprising a plate and a cathode, said second stage comprising a plate, a cathode and a control grid, a first resistor and a capacitor in parallel disposed between the first stage cathode and ground, a second resistor disposed between the first stage plate and ground, means to apply said first voltage source to the first stage plate, the cathode of the first stage being electrically connected directly to the grid of the second stage, the second stage having a combination of fixed and a self-bias, positive voltage applied to the grid thereby causing heavy conduction of the second stage, a plate current relay operated by second stage conduction, said relay remaining energized in accordance with the length of positive applied pulse applied to the first stage plate and with the R-C time constant of the first resistor and the capacitor; an integrator unit comprising a diode stage and a triode stage, a plate relay in the triode stage energized by positive pulses applied to the diode plate, means to apply a train of pulses to the diode plate, and means to maintain the grid positive enough to allow conduction above the deenergization point of the relay during a time interval of the train of pulses.

18. The apparatus of claim 10, said major assembly comprising an information pulse amplifier relay, an integrating amplifier relay to route information, a first and a second information reset amplifier relay to control information reset functions, a first and a second pulse amplifier relay to provide information control, an execute amplifier relay to control execute information, a transmitter keying amplifier relay to control transmitter operation, a station selector panel switch-controlled power relay, an information transfer relay energized during control station operation to selectively transfer information circuits for receiving and control station operation, a station reset relay to complete station reset functions, a route information relay operable to route information on simplex operation, an information reset relay energizable to reset the entire indicator information panel of the indicator, an information control pulse relay to generate an information control pulse, a row stepping switch having a step coil and a reset coil, said step coil being in parallel with said information control pulse relay, a route information relay energized in station selected operation, a 00 station selection operation relay, a station selection relay, a first and a second routing relay to route transmitter keying information, said second routing relay remaining energized during control station operation, an add-subtract relay to store information pulses during simplex operation, said add-subtract relay being adapted to selectively step clockwise and counterclockwise, a three level row stepping switch and a first and second three level column-stepping switch, each of said levels containing ten positions to route information, a station selection stepping switch having one level of 10 positions for routing station selection information, a preventing switch to prevent said station selection stepping switch from stepping beyond the third position, a shaft to rotate said station selection stepping switch, said preventing switch being mechanically linked to said shaft.

19. In a visual display radio signalling system comprising a plurality of receiving stations and a control station comprising a data-transmission-display group, transmitting means and repeatback receiving means, said data-transmission-display group comprising a first power relay; the station selector combination comprising a first on-off switch to energize said first relay to place the data-transmission group in operation, a second and a third relay, a second and a third multi-position switch, means to effect position correspondence of said second relay and second switch and said third relay and third switch, respectively, a fourth 00 general call switch to provide transmitter control during general call, said second and third switches remaining on preselected station number for general call and means to introduce a first and a second series of pulses to actuate the second and the third relay to assume a position to cause the display system to selectively receive and display information only in on position of said fourth switch, and to permit retransmission of information in the off position of the fourth switch.

20. In a display signalling system comprising a control station and at least one receiving station; said system comprising an indicator unit to display received information comprising a plurality of message registers arranged in rows, said indicators having means to initiate repeatback signals, a station selection indicator, an information receiving indicator and an execute indicator and acknowledgment initiating means, said plurality of indicators being arranged in a plurality of rows of equal numbers of registers and a row containing an additional register, said additional prefix register having a display face of size different from the remaining register display faces, the remaining register display faces being of substantially equal sizes.

21. The apparatus of claim 20 including pulse means to effect stepping of a predetermined selected registers of said plurality of registers in accordance with the number of pulses and information to be recorded, means to effect resetting of the message registers and means to effect operation of each of the indicators.

22. A visual display radio signalling system comprising a control station and at least one receiving station, said control station comprising a data-transmission-display group, transmitting means, receiving means, and a keyer control unit to originate and display all information sent from the control station, an indicator panel comprising a plurality of message registers, a dial pulser to originate all station selection, row selection and information pulses, means to reset all circuits in both control and receiving stations, except the message registers on the indicator panel, information reset means to reset any incomplete sequence of information when error has been noted and in conjunction with the dial pulser to reset all information displayed on the indicator panel, means to initiate transmission of an execute control pulse and an indicator to indicate sending of execute signals.

23. The apparatus of claim 22, said keyer control unit comprising a first and a second message register to display the number of the receiving station which is selected, a third row select message register to indicate the row on which information will be displayed, a fourth message register used only when transmitting on the information row to indicate the prefix for the information row, a fifth, sixth and seventh message register to display digital information of any selected row and an indicator to indicate when an execute control pulse is being sent.

24. The apparatus of claim 22, said keyer control unit comprising station reset switch means; first, second, third, fourth, fifth, sixth and seventh message registers each having a reset coil and a stepping coil, a first relay, second, third and fourth relays each having a reset coil and a stepping coil, a dial pulser, a second switch, a fifth relay, switch contact means, a sixth relay, closing the station reset switch means energizing said first relay to energize the reset coils of the second, third and fourth relays and energizing the reset coils of each of the message registers, dialing means to operate the dial pulser, operation of said dial pulser placing a positive voltage pulse through said second switch equal in time length to the entire train of pulses originated by the dial to energize said fifth relay, thereby stepping said second relay to a first position; releasing of the dial originating a train of pulses from the switch contacts to pulse said sixth relay, said sixth relay applying a pulse to the stepping coil of the first message register through the first position of said second relay each time said sixth relay is pulsed, dialing a second digit corresponding to desired station code number stepping said second relay to a second position to send pulses to the second message register stepping coil, to thereby effect station selection, a seventh relay, dialing a number corresponding to desired row stepping said second relay to a third position to route a pulse from said second switch to energize said seventh relay to in turn energize the stepping coil of said fourth relay, said fourth relay thereby assuming a first position, said second relay then effecting a third position, information pulses originated in said dial pulser means causing stepping of said third register to indicate selected row, an eighth and ninth relay, an off-normal switch, dialing causing the seventh relay to cause stepping of said second and fourth relays to route pulses from the dial pulser to the third, fourth and fifth message registers, dialing the third numeral in a row energizing the eighth and ninth relays in turn, a self-holding contact on said ninth relay obtaining power through said off-normal switch, return of the dial opening the dial pulser to deenergize the seventh relay to open the off-normal switch to deenergize the ninth relay, thereby completing a sequence of information and placing information on the third, fourth and fifth message registers, means to transmit information on a second row, means to change information on any row, means to reset the message registers of a row, said dial pulser including magnetic brake means to lock dial release and stop operation of the dial pulser.

References Cited in the file of this patent

UNITED STATES PATENTS

| | | |
|---|---|---|
| 1,702,423 | Wensley | Feb. 19, 1929 |
| 1,930,525 | Levy | Oct. 17, 1933 |
| 2,475,848 | May | July 12, 1949 |
| 2,535,162 | Rodgers | Dec. 26, 1950 |
| 2,557,581 | Triman | June 19, 1951 |
| 2,580,453 | Murray | Jan. 1, 1952 |
| 2,629,088 | Kendall | Feb. 17, 1953 |
| 2,719,284 | Roberts et al. | Sept. 27, 1955 |
| 2,740,106 | Phelps | Mar. 27, 1956 |
| 2,764,754 | Garfield | Sept. 25, 1956 |

UNITED STATES PATENT OFFICE
CERTIFICATE OF CORRECTION

Patent No. 2,903,675 September 8, 1959

Curtis L. Downey et al.

It is hereby certified that error appears in the printed specification of the above numbered patent requiring correction and that the said Letters Patent should read as corrected below.

Column 40, line 59, for "tunes" read -- tones --; line 66, strike out "tones and said" and insert the same after "said" in line 65, same column; column 41, line 66, strike out "said" and insert the same before "receiving", second occurrence, in the same line 66; column 42, line 30, for "hgh" read -- high --.

Signed and sealed this 13th day of September 1960.

(SEAL)
Attest:

KARL H. AXLINE
Attesting Officer

ROBERT C. WATSON
Commissioner of Patents